(12) United States Patent
Yamada et al.

(10) Patent No.: US 11,305,270 B2
(45) Date of Patent: Apr. 19, 2022

(54) HONEYCOMB STRUCTURE, HONEYCOMB STRUCTURE TYPE CATALYST AND PRODUCTION METHODS THEREFOR

(71) Applicant: N.E. CHEMCAT CORPORATION, Tokyo (JP)

(72) Inventors: Takashi Yamada, Tokyo (JP); Shingo Ishikawa, Tokyo (JP); Yoshinori Takahashi, Tokyo (JP); Kazuhiro Sekiyama, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 132 days.

(21) Appl. No.: 16/328,030

(22) PCT Filed: May 15, 2017

(86) PCT No.: PCT/JP2017/018173
§ 371 (c)(1),
(2) Date: Feb. 25, 2019

(87) PCT Pub. No.: WO2018/037637
PCT Pub. Date: Mar. 1, 2018

(65) Prior Publication Data
US 2019/0193067 A1 Jun. 27, 2019

(30) Foreign Application Priority Data

Aug. 26, 2016 (JP) .............................. JP2016-166161
Oct. 18, 2016 (JP) .............................. JP2016-204129

(51) Int. Cl.
*B01J 21/04* (2006.01)
*B01J 21/06* (2006.01)
(Continued)

(52) U.S. Cl.
CPC ...... *B01J 37/0215* (2013.01); *B01D 46/2429* (2013.01); *B01D 46/2455* (2013.01);
(Continued)

(58) Field of Classification Search
CPC . B01J 21/04; B01J 21/066; B01J 23/10; B01J 23/40; B01J 23/42; B01J 23/44;
(Continued)

(56) References Cited

U.S. PATENT DOCUMENTS 4,448,833 A * 5/1984 Yamaguchi ........ B01D 46/2407
428/116
5,346,722 A 9/1994 Beauseigneur et al.
(Continued)

FOREIGN PATENT DOCUMENTS

EP 1063396 A2 12/2000
EP 1489277 A1 12/2004
(Continued)

OTHER PUBLICATIONS

Extended (Supplementary) European Search Report dated Feb. 14, 2020, issued in counterpart EP Application No. 17843126.8. (7 pages).
(Continued)

*Primary Examiner* — Cam N. Nguyen
(74) *Attorney, Agent, or Firm* — Westerman, Hattori, Daniels & Adrian, LLP

(57) ABSTRACT

A honeycomb structure prevents catalyst slurry from leaching out when applying a wash coat for making a catalyst supported, ensuring air permeability of the outer portion and in which there is no occurrence of cracking when used as a gasoline particulate filter. The honeycomb structure having: a honeycomb substrate composed of porous partition walls forming a plurality of cells and a porous outer portion; and a resin composition on the outer portion of the honeycomb
(Continued)

substrate, wherein the outer portion and the partition walls of the honeycomb substrate are formed of the same material; a porosity of the honeycomb structure is 50% or more; and the resin composition is impregnated into pores of the whole outer portion; and the impregnation depth is equal to the outer portion thickness or a part of the resin composition is impregnated deeper than the outer portion and reaches the cell partition walls.

15 Claims, 5 Drawing Sheets

(51) Int. Cl.
| | |
|---|---|
| B01J 23/10 | (2006.01) |
| B01J 23/40 | (2006.01) |
| B01J 23/42 | (2006.01) |
| B01J 23/44 | (2006.01) |
| B01J 23/46 | (2006.01) |
| B01J 23/63 | (2006.01) |
| B01J 35/04 | (2006.01) |
| B01J 35/10 | (2006.01) |
| B01J 37/02 | (2006.01) |
| B01J 37/08 | (2006.01) |
| F01N 3/035 | (2006.01) |
| F01N 3/28 | (2006.01) |
| B01D 53/94 | (2006.01) |
| B01D 46/24 | (2006.01) |

(52) U.S. Cl.
CPC .............. *B01D 53/94* (2013.01); *B01J 21/04* (2013.01); *B01J 21/066* (2013.01); *B01J 23/10* (2013.01); *B01J 23/44* (2013.01); *B01J 23/464* (2013.01); *B01J 23/63* (2013.01); *B01J 35/04* (2013.01); *B01J 35/10* (2013.01); *B01J 35/1076* (2013.01); *B01J 37/02* (2013.01); *B01J 37/0236* (2013.01); *B01J 37/08* (2013.01); *F01N 3/035* (2013.01); *F01N 3/28* (2013.01); *B01D 46/24491* (2021.08); *B01D 46/24492* (2021.08); *B01D 2255/9155* (2013.01); *B01D 2279/30* (2013.01)

(58) Field of Classification Search
CPC . B01J 23/464; B01J 23/63; B01J 35/04; B01J 35/10; B01J 35/1076; B01J 37/02; B01J 37/0215; B01J 37/0236; B01J 37/08; F01N 3/035; F01N 3/28
See application file for complete search history.

(56) References Cited

U.S. PATENT DOCUMENTS

| | | | | |
|---|---|---|---|---|
| 6,827,754 B2* | 12/2004 | Suwabe | ................... | F01N 3/035 55/523 |
| 6,984,253 B2* | 1/2006 | Ichikawa | ................ | B28B 1/002 55/484 |
| 7,083,842 B2* | 8/2006 | Masukawa | ............... | B01J 35/04 428/116 |
| 7,510,755 B2* | 3/2009 | Masukawa | ........... | C04B 37/005 428/116 |
| 7,615,273 B2* | 11/2009 | Ichikawa | ........... | B01D 46/2455 428/116 |
| 7,754,160 B2* | 7/2010 | Miyairi | .................... | B01J 35/10 422/180 |
| 7,867,598 B2* | 1/2011 | Miyairi | ................. | C04B 35/584 428/116 |
| 7,897,099 B2* | 3/2011 | Suenobu | ............ | B01D 46/2429 264/629 |
| 7,897,237 B2* | 3/2011 | Ichikawa | ............. | B01D 46/247 428/116 |
| 7,981,497 B2* | 7/2011 | Ichikawa | ............ | C04B 41/5024 428/116 |
| 8,053,054 B2* | 11/2011 | Iwata | .................... | C04B 37/005 428/116 |
| 8,093,173 B2* | 1/2012 | Miyairi | .............. | B01D 46/2425 502/178 |
| 8,105,675 B2* | 1/2012 | Masukawa | ......... | B01D 39/2075 428/116 |
| 8,323,767 B2* | 12/2012 | Ido | ........................... | B01J 35/04 428/116 |
| 8,329,111 B2* | 12/2012 | Mizutani | ............. | C04B 38/0019 422/180 |
| 8,470,254 B2* | 6/2013 | Mizutani | ............... | C04B 35/565 422/177 |
| 8,470,255 B2* | 6/2013 | Mizutani | ............... | C04B 37/005 422/177 |
| 8,603,942 B2* | 12/2013 | Goto | ..................... | B01J 37/0248 502/439 |
| 8,609,581 B2* | 12/2013 | Miyairi | .............. | C04B 38/0009 502/423 |
| 8,623,488 B2* | 1/2014 | Yamaguchi | ........... | F01N 3/0222 428/116 |
| 8,632,872 B2* | 1/2014 | Ichikawa | ............ | C04B 38/0009 428/116 |
| 8,691,157 B2* | 4/2014 | Kunieda | .................. | B01J 29/88 422/180 |
| 8,961,886 B2* | 2/2015 | Kunieda | .................. | B01J 29/88 422/177 |
| 9,006,138 B2* | 4/2015 | Goto | ...................... | B01J 35/023 502/439 |
| 9,138,674 B2* | 9/2015 | Takahashi | ............. | C04B 35/565 |
| 9,188,044 B2* | 11/2015 | Aoki | ........................ | B01J 35/04 |
| 9,248,440 B2* | 2/2016 | Hirose | ................ | B01J 29/7615 |
| 9,303,542 B2* | 4/2016 | Aoki | .................... | C04B 38/0009 |
| 9,303,543 B2* | 4/2016 | Aoki | .................... | B01J 35/1076 |
| 9,346,043 B2* | 5/2016 | Hirose | ................ | B01J 35/1023 |
| 9,464,551 B2* | 10/2016 | Hirose | ................. | F01N 3/2828 |
| 9,506,384 B2* | 11/2016 | Kikuchi | ................ | F01N 3/2828 |
| 9,700,842 B2* | 7/2017 | Miyairi | ............... | B01D 46/247 |
| 9,822,681 B2* | 11/2017 | Kikuchi | ............. | B01D 46/2474 |
| 9,956,739 B2* | 5/2018 | Aoki | .................... | C04B 38/0006 |
| 10,040,017 B2* | 8/2018 | Kikuchi | ............. | B01D 46/2429 |
| 10,232,298 B2* | 3/2019 | Kikuchi | .................. | F01N 3/0222 |
| 10,632,409 B2* | 4/2020 | Kikuchi | ............. | B01D 46/2455 |
| 10,675,591 B2* | 6/2020 | Kurimoto | .......... | B01D 46/2474 |
| 2002/0022109 A1 | 2/2002 | Ichikawa et al. | | |
| 2003/0003232 A1 | 1/2003 | Rosynsky et al. | | |
| 2005/0261128 A1 | 11/2005 | Hirai | | |
| 2006/0210764 A1* | 9/2006 | Yamada | .................. | C04B 41/52 428/116 |
| 2007/0196248 A1* | 8/2007 | Mizutani | .................. | B01J 35/04 422/180 |
| 2009/0324455 A1* | 12/2009 | Mizutani | ............... | C04B 41/009 422/180 |
| 2010/0215898 A1* | 8/2010 | Suenobu | .............. | B01D 46/0001 428/116 |
| 2010/0242424 A1* | 9/2010 | Harada | ............... | C04B 38/0009 55/486 |
| 2011/0030346 A1 | 2/2011 | Neubauer et al. | | |
| 2013/0236687 A1* | 9/2013 | Hirose | ................. | B01J 35/1028 428/116 |
| 2014/0245724 A1* | 9/2014 | Tanaka | ................. | B01J 35/0013 60/297 |
| 2015/0078966 A1 | 3/2015 | Okajima et al. | | |
| 2015/0107228 A1 | 4/2015 | Klingmann et al. | | |
| 2016/0074800 A1 | 3/2016 | Ito et al. | | |

FOREIGN PATENT DOCUMENTS

| | | |
|---|---|---|
| JP | H07-10650 A | 1/1995 |
| JP | 2000-000809 A | 1/2000 |
| JP | 2001-000871 A | 1/2001 |
| JP | 2003-506211 A | 2/2003 |
| JP | 2004-113887 A | 4/2004 |
| JP | 2013-500857 A | 1/2013 |

(56) References Cited

FOREIGN PATENT DOCUMENTS

| JP | 2013-212500 A | 10/2013 |
| JP | 2015-528868 A | 10/2015 |
| JP | 2016-55282 A | 4/2016 |
| WO | 2013/172128 A1 | 11/2013 |
| WO | 2016/088523 A1 | 6/2016 |
| WO | 2016/129644 A1 | 8/2016 |

OTHER PUBLICATIONS

International Search Report dated Aug. 8, 2017, issued in counterpart application No. PCT/JP2017/018173, with English translation. (5 pages).

Notification of Transmittal of Translation of the International Preliminary Report on Patentability (Form PCT/IB/338) issued in counterpart International Application No. PCT/JP2017/018173 dated Mar. 7, 2019 with Forms PCT/IB/373 and PCT/ISA/237, with English translation. (20 pages).

* cited by examiner

HONEYCOMB STRUCTURE, HONEYCOMB STRUCTURE TYPE CATALYST AND PRODUCTION METHODS THEREFOR

TECHNICAL FIELD

The present invention relates to a honeycomb structure, a honeycomb structure type catalyst, and production methods therefor, and more specifically, to a honeycomb structure capable of preventing a catalyst slurry from leaching out to an outer portion thereof when applying a wash coat for making a catalyst supported, a honeycomb structure type catalyst which is capable of ensuring air permeability of the outer portion and in which no cracking occurs when used as a gasoline particulate filter (GPF), and production methods therefor.

BACKGROUND ART

Car exhaust gas contains various kinds of harmful substances, such as nitrogen oxides (NOx), hydrocarbon (HC) and carbon oxide (CO), which derive from unburned fuel, and various kinds of methods to remove those substances have long been developed and implemented.

Exhaust gas sources, in addition to gasoline-powered cars, include diesel-powered cars mounted with a diesel engine that uses diesel oil as a fuel. For exhaust gas from diesel-powered cars, in addition to NOx, HC, and CO mentioned above, particulate matter (PM) is also known, and a diesel particulate filter (DPF) has widely been used as an apparatus for removing PM.

DPF is a general term for filtering apparatuses for exhaust gas purification, which are also known as wall-flow honeycomb filters, and this type of apparatus is of a honeycomb structure that includes a plurality of cells partitioned by partition walls from an inlet end to an outlet end of each of the cells and these cells are alternately plugged at the inlet end and the outlet end. The partition walls defining the cells each have air permeability, and this air permeability is utilized to filter out PM from exhaust gas to thereby perform PM removal.

PM filtered out from exhaust gas through the DPF is continuously deposited on the DPF, whereby clogging occurs. To prevent this clogging, PM deposited on the DPF is burned by using exhaust gas heat or injecting fuel into an engine combustion chamber or into exhaust gas to regenerate the DPF having PM deposited thereon. To facilitate such regeneration, the cell partition walls of the DPF are coated with a catalyst component in some cases, and the DPF coated with the catalyst component is referred to as a catalyzed soot filter (CSF) in some cases. The applicant has also proposed this type of system that incorporates a catalyst (for example, see Patent Literature 1).

Conventionally, removal of PM in exhaust gas has widely been in demand for diesel-powered cars because diesel-powered cars use diesel oil that does not burn easily. However, gasoline-powered cars that use fuel with less PM generated have not been particularly focused as an environmental problem up until now.

With growing concerns over the environmental issues these days, however, restriction on harmful substances in exhaust gas has become stricter, and the amount of PM exhausted from gasoline-powered cars has also come to be restricted. Especially these years, there has been a growing concern over fuel efficiency in the market, and the mainstream of gasoline engines has shifted to gasoline direct injection engines, which perform direct injection to supply gasoline into a combustion chamber under precise control. However, in these gasoline direct injection (GDI) type engines, the interior of the combustion chamber is in a combustion state while part of the atomized gasoline injected into the combustion chamber is maintained in a form of particles, so that incomplete combustion attributed to particle-like fuel occurs, and in some cases, a larger amount of PM is generated than from conventional gasoline-powered cars using an intake manifold from which a mixed gas including fuel and the air is supplied. All things considered, needs for restriction on exhaust gas is becoming more likely.

It is expected that the removal of PM from exhaust gas of gasoline-powered cars also uses a wall-flow honeycomb filter similarly to the DPF for diesel-powered cars. However, for the reasons as follows, due to characteristics of gasoline-powered cars, it is not easy for gasoline-powered cars to use the same DPF as that for diesel-powered cars.

One of major differences between gasoline-powered cars and diesel-powered cars is a difference in exhaust gas velocity therebetween. A diesel engine injects fuel to the air compressed by high pressure, and causes the fuel to ignite with the pressure effect to make explosion, from which kinetic energy is extracted. Thus, diesel engines, which use a high compression state, are efficient engines, but because diesel engines create a high compression state, the engine rotation speed of diesel engines is lower than that of gasoline-powered cars, and accordingly the exhaust-gas velocity of diesel-powered cars is lower than that of gasoline-powered cars. The DPF is designed for cars with lower exhaust gas velocity, and does not need to provide air permeability to an outer side of the honeycomb structure (hereinafter, it may be referred to as "outer portion"). Thus conventionally, to enhance the strength of the honeycomb structure, the outer portion is formed of a dense high-strength ceramics material. Moreover, diesel-powered cars normally have lower engine rotation speed, and the temperature of diesel-car exhaust gas during traveling is lower than that of gasoline-car exhaust gas.

Exhaust gas from gasoline engines, however, is different from that for diesel engines in the following condition. Gasoline engines cause a spark plug to ignite air-fuel mixed gas, and have a lower compression ratio than general diesel engines. Thus, gasoline engines can be operated at high rotation speed to provide high output power. Moreover, in response to the today's market demand for improved fuel consumption, high-power engines also tend to be downsized aiming for weight reduction of vehicles. For a small engine to provide high power, it is necessary to operate the engine at high rotation speed and supply a large quantity of air to the interior of a cylinder with a supercharger. However, the velocity of exhaust gas exhausted from the engine operating at high rotation speed and in a supercharged state is even higher. Using the conventional DPF for such exhaust gas with high velocity would increase the back pressure of the engine, which obstructs improvement of engine output power.

Furthermore, if the outer portion of the honeycomb structure (hereinafter, it may be referred to as outer peripheral wall) has a wall made of another material, there may be a concern over cracking due to difference in the thermal expansion coefficient in a catalyst for gasoline engines, the temperature of which during traveling is higher than that of diesel engines. Therefore, it is considered preferable that the wall and the outer portion are integrally molded.

Consequently, for a filter for removing PM from exhaust gas from gasoline engines, a honeycomb filter having an outer portion that has air permeability, instead of having a dense outer portion that has no air permeability to obtain higher strength as in the DPF, has been considered. Such a PM filter for gasoline engines may also be referred to as a gasoline particulate filter (GPF) (refer to Patent Literature 3, for example).

Using the GPF enables removal of PM from exhaust gas without causing the back pressure to easily increase, but at the same time, a new problem has emerged in producing it as a catalyst.

Generally, exhaust gas purification for gasoline engines uses a honeycomb structure made to have a catalytic function with a three-way catalyst (TWC) containing components of noble metals such as platinum, palladium, and rhodium, to remove simultaneously NOx, HC, and CO. For conventional TWC, a honeycomb structure in which both end faces of a cell are open, which is called flow-through honeycomb, has been used, as opposed to a honeycomb structure with both end faces thereof plugged to each other as with the DPF, and the partition walls of the cells of the flow-through honeycomb are coated with the catalyst component. This type of flow-through honeycomb provides less increase in the back pressure, and is suitable for treating high velocity exhaust gas of gasoline engines.

When the flow-through honeycomb or the DPF is made to have a catalytic function with a catalyst composition such as TWC, a production method generally known as a wash coating method is applied (refer to Patent Literature 2, for example).

Various kinds of methods have been developed and implemented for wash coating, the basic principle of which comprises "step of supplying a catalyst component slurry into the interior of honeycomb cells" and "step of discharging the supplied slurry in the cells with air pressure". In the "step of discharging the supplied slurry in the cells with air pressure", it is possible to remove excess slurry from the flow-through honeycomb without particular trouble. The conventional DPF, which has a dense outer portion thereon, is also able to remove excess slurry without trouble similarly.

However, the GPF has a problem in suppressing back pressure increase, and thus the outer peripheral wall of the GPF needs to be formed of a porous material having air permeability as in the case with the partition walls of the cells to enable exhaustion also from the outer portion, using a honeycomb structure having a porosity of 50% or higher, or more specifically 60% or higher.

The relatively small honeycomb structure used for the GPF is usually formed integrally with partition walls and an outer portion. Such a honeycomb substrate is produced by simultaneously forming the partition walls and the outer peripheral wall by means of extrusion molding and firing the obtained molded body, and the outer portion and the partition walls have the same porosity. In addition, since such a small honeycomb is used, the geometric area thereof as a filter is also small, and there is a great concern over output reduction associated with pressure loss.

However, the ends of the honeycomb cells are plugged, and the plugged portions are obstructive in "step of discharging the supplied slurry in the cell with air pressure" during wash coating, and thus the slurry discharged with air pressure leaches out from the outer portion.

Slurry thus leaching out from the outer portion not only contaminates a wash coating apparatus but also wastes the valuable noble metals. Moreover, if the valuable noble metal components for an automotive catalyst, which are strictly managed in ingredient amount for cost savings, leach out from the outer portion, it makes it difficult to manage the ingredient amount to cause unevenness of the ingredient amount. This unevenness in the ingredient amount is regarded as a defect in production. Furthermore, the automotive catalyst achieves industrially implementable performance only when the ingredient amount is properly managed. Slurry leaching out to the outer portion makes it difficult to manage the amount of catalyst supported on each honeycomb structure during mass production, and thus makes it extremely difficult to provide stable purification performance.

When the catalyst slurry penetrates to the outer portion of a porous honeycomb such as the GPF, a difference in the thermal expansion coefficient occurs between the components in the slurry and the material of the honeycomb, so that, in some cases, cracking occurs during the firing in the catalyst production process or during the cooling processing after this firing, or due to the heat history when the car is traveling.

As described above, in the wall-flow honeycomb for the GPF, the porosity is high in order to reduce the pressure loss, and since the outer peripheral wall is also of a porous material having air permeability as with the cell partition walls, occurrence of cracking due to penetration of the catalyst slurry is serious. Furthermore, since the catalyst slurry contains a large amount of fine particles of inorganic oxides such as alumina along with active noble metals, cracking is further promoted by the influence of the inorganic oxide particles impregnated into the outer peripheral wall.

Moreover, the catalyst component filling up micro cracks existing in the honeycomb outer portion with a catalyst component impairs the ability to handle the stress caused by the difference in the thermal expansion coefficient, and cracking occurs as a result (for example, refer to Patent Document 8). If a catalyst component exists on the outer peripheral wall of the honeycomb, cracking may occur due to the reason such as uneven temperature distribution when a temperature difference occurs between the outer circumferential part and the inner part due to the difference in thermal conductivity.

A suitable means to be able to prevent slurry from leaching out from the outer portion has been thus desired for the GPF. Moreover, the means is also desired that has no disadvantageous effect such as pressure drop on a product after application of a catalyst, that is to say, the means is able to provide competing goals. The means is also desired that can be applied stably and inexpensively and can be produced in a mass production manner.

Conventionally, as a technique for improving the strength of a honeycomb structure, there is known a technique for attaching a reinforcing material to an outer peripheral wall. For example, Patent Literature 4 and Patent Literature 7 disclose a honeycomb structure in which the outer circumferential part of the honeycomb structure is reinforced with a material that disappears or disperses at a high temperature. In addition, Patent Literature 5 discloses a honeycomb structure in which a material having a thermal expansion coefficient substantially equal to that of the catalyst is attached onto the entire outer peripheral wall of the ceramic honeycomb structure before making a catalyst supported thereon. Furthermore, Patent Literature 6 discloses a honeycomb catalyst carrier in which a water-insoluble organic substance that is burned off by burning or an impregnated portion impregnated with an inorganic substance is formed at the outermost circumferential portion having a predetermined thickness of an outer wall made of a porous material.

In some of these prior art literatures there are descriptions on a reinforcing material that disappears or disperses in a high-temperature treatment when burning a catalyst on a honeycomb structure. However, preventing catalyst slurry from leaching out when a porous honeycomb structure having excellent air permeability even on the outer peripheral wall as with the honeycomb for the GPF, and improving isostatic strength are not considered, or cracking due to heat history at the time of producing the catalyst or at the time of using the GPF is not taken in to consideration.

CITATION LIST

Patent Literature

[Patent Literature 1] Re-published Japanese Translation of PCT Application No. 2013-172128
[Patent Literature 2] Publication of Japanese Translation of PCT Application No. 2003-506211
[Patent Literature 3] Publication of Japanese Translation of PCT Application No. 2015-528868
[Patent Literature 4] Japanese Unexamined Patent Application, First Publication No. 2000-809
[Patent Literature 5] Japanese Unexamined Patent Application, First Publication No. 2001-871
[Patent Literature 6] Japanese Unexamined Patent Application, First Publication No. 2004-113887
[Patent Literature 7] Japanese Unexamined Patent Application, First Publication No. 2016-55282
[Patent Literature 8] Japanese Unexamined Patent Application, First Publication No. H07-10650

SUMMARY OF INVENTION

Technical Problem

The present invention takes the above circumstances in to consideration.

An object of the present invention is to provide a honeycomb structure capable of preventing catalyst slurry from leaching out to an outer portion thereof when applying a wash coat for making a catalyst supported, a honeycomb structure type catalyst which is capable of ensuring air permeability of the outer portion and in which no cracking occurs when used as a gasoline particulate filter (GPF), and production methods therefor.

Solution to Problem

The inventors of the present invention have made extensive and intensive studies to solve the above-mentioned problems. As a result, the inventors have found that, in a honeycomb structure having partition walls that form a plurality of cells and a porous outer portion in which the outer portion impregnated with a resin composition has a high porosity, if the outer portion is impregnated with a sufficient amount of a resin liquid and the impregnation depth is greater than or equal to the outer portion thickness, the catalyst slurry does not leach out to the outer portion when making a catalyst supported on the obtained honeycomb structure by means of wash coating, the strength thereof is increased to thereby suppress the occurrence of cracking, and air permeability can be ensured in the outer portion, so that a honeycomb structure type catalyst suitable for GPF can be produced, and the invention has been completed.

That is to say, according to a first invention of the present invention, there is provided a honeycomb structure having: a honeycomb substrate composed of porous partition walls forming a plurality of cells and a porous outer portion; and a resin composition on the outer portion of the honeycomb substrate, wherein the outer portion and the partition walls of the honeycomb substrate are formed of the same material; a porosity of the honeycomb structure is 50% or more; and the resin composition is impregnated into pores of the whole outer portion; and the impregnation depth is equal to the outer portion thickness or at least a part of the resin composition reaches the cell partition walls.

According to a second invention of the present invention, there is provided a honeycomb structure such that in the first invention, the resin composition includes one or more organic resin components selected from polyvinyl alcohol (PVA), acrylic resin, acrylic silicone resin, acrylic styrene resin, vinyl acetate resin, polyurethane resin, polyethylene glycol (PEG), agar, gelatin, starch, sucrose, and wax.

According to a third invention of the present invention, there is provided a honeycomb structure such that in the first or second invention, the resin composition does not contain inorganic particles.

According to a fourth invention of the present invention, there is provided a honeycomb structure such that in any one of the first to third inventions, the honeycomb substrate has a porosity of 50 to 80%.

According to a fifth invention of the present invention, there is provided a honeycomb structure such that in any one of the first to third inventions, the honeycomb substrate has a porosity of 60 to 70%.

According to a sixth invention of the present invention, there is provided a honeycomb structure such that in any one of the first to fifth inventions, the honeycomb substrate has an overall length of 50 to 300 mm and the honeycomb substrate has an end face width (a diameter in a case of a circular end face) of 50 to 200 mm.

According to a seventh invention of the present invention, there is provided a honeycomb structure such that in any one of the first to sixth inventions, the honeycomb substrate has an average pore diameter of 10 to 25 μm measured by a mercury porosimeter.

According to an eighth invention of the present invention, there is provided a honeycomb structure such that in any one of the first to seventh inventions, the resin composition has a coating amount of 8 g/L or more per unit volume of the honeycomb structure.

According to a ninth invention of the present invention, there is provided a honeycomb structure such that in any one of the first to eighth inventions, the cells each have a plugged portion in an open end on an inlet end face side and in an open end on an outlet end face side, and the plugged portions are alternately arranged.

According to a tenth invention of the present invention, there is provided a method for producing a honeycomb structure type catalyst, the method comprising: using the honeycomb structure according to any one of the first to ninth invention in which all pores of the outer portion and at least a part of the cell partition walls are impregnated with the resin composition; immersing the honeycomb structure in catalyst composition slurry; coating, with a resin composition, the cell partition walls that are not impregnated with the resin composition; and firing the honeycomb structure after being allowed to dry to burn off the resin composition.

According to an eleventh invention of the present invention, there is provided the method for producing a honeycomb structure type catalyst such that in the tenth invention, the catalyst composition slurry has a particle diameter D90 of 5 μm or less when a cumulative distribution from a small particle diameter side in a particle size distribution is 90%, and an impregnation coating amount of the catalyst composition per unit volume of the honeycomb structure is 10 to 200 [g/L].

According to a twelfth invention of the present invention, there is provided a honeycomb structure type catalyst such that a catalyst composition is supported on a honeycomb structure composed of a honeycomb substrate having porous partition walls forming a plurality of cells and a porous outer portion, in which:

the outer portion and the partition walls of the honeycomb substrate are integrally formed of the same material; a porosity of the honeycomb structure is 50% or more; the catalyst composition is supported only on the partition walls of the cells and is not supported inside or on the surface of the outer portion; and inorganic particles that are components of the catalyst composition are not contained in the outer portion pores.

According to a thirteenth invention of the present invention, there is provided the honeycomb structure type catalyst such that in the twelfth invention, the honeycomb substrate has a porosity of 50 to 80%, and an average pore diameter measured by a mercury porosimeter of the cell partition walls and the outer portion of the honeycomb substrate is 10 to 25 μm, and the cells of the honeycomb substrate each have a plugged portion in an open end on an inlet end face side and in an open end on an outlet end face side, and the plugged portions are alternately arranged.

According to a fourteenth invention of the present invention, there is provided the honeycomb structure type catalyst such that in the twelfth invention, the catalyst composition contains one or more noble metal elements selected from Pt, Pd and Rh.

According to a fifteenth invention of the present invention, there is provided the honeycomb structure type catalyst such that in the twelfth invention, the honeycomb structure type catalyst is a gasoline particulate filter (GPF).

Advantageous Effects of the Invention

In a honeycomb structure of the present invention: a resin composition is impregnated into pores of an entire outer portion; an impregnation depth thereof corresponds to a thickness of the outer portion; the pores of the outer portion are completely impregnated with the resin composition; all of the pores of the outer portion are blocked; and at least a part of the resin composition is impregnated deeper than the outer portion and reaches the cell partition walls. As a result, even if catalyst slurry is impregnated and coated using a high porosity honeycomb substrate having a porosity of 50% or more, the catalyst slurry does not penetrate into the outer peripheral wall.

That is to say, when the catalyst slurry is introduced into the cells to prepare a honeycomb structure type catalyst, the slurry does not leach out from the outer portion, and therefore, the wash coating apparatus does not become contaminated and the valuable noble metals will not be wasted. As a result, management of the catalyst component amount becomes easy, and mass production of the catalyst can be realized.

Moreover, the catalyst slurry does not penetrate into the outer portion of the porous honeycomb, and therefore, a difference in the thermal expansion coefficient does not occur between the components in the slurry and the material of the honeycomb, so that cracking does not occur mainly from the outer portion during the firing in the catalyst production process or due to the heat history at the time of cooling after the firing. In addition, the honeycomb structure type catalyst does not cause an increase in pressure loss, cracking due to the heat history while the car is traveling can be suppressed, and stable exhaust gas purification performance can be obtained as a GPF.

DESCRIPTION OF EMBODIMENTS

Figure 1:
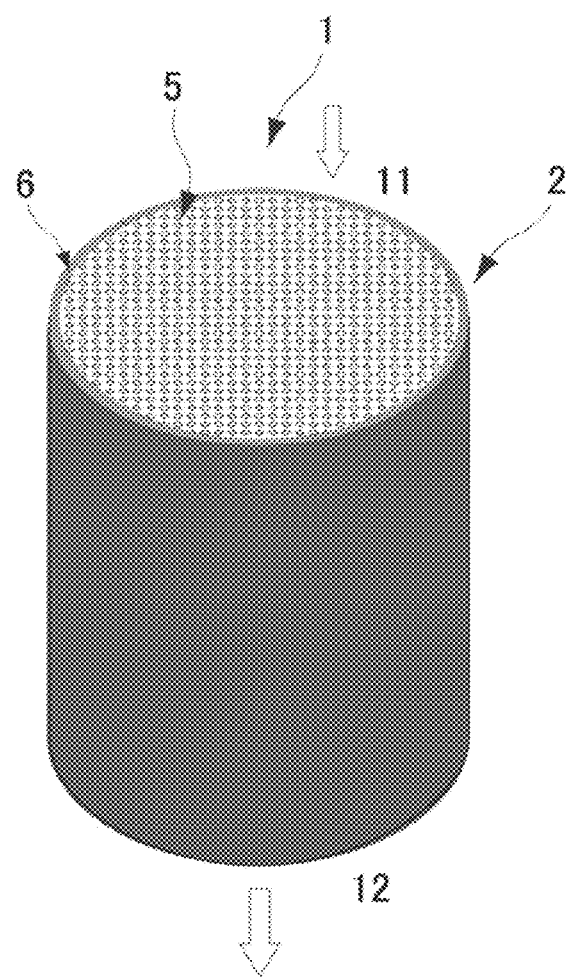
FIG. 1 is a perspective view schematically showing an exemplary embodiment of a honeycomb structure of the present invention.

Hereinafter, the present invention will be described on the basis of specific embodiments. However, the invention should not be interpreted as being limited to these embodiments, and without departing from the scope of the invention, appropriate modifications and improvements may be made on the basis of ordinary knowledge of those skilled in the art.

1. Honeycomb Structure

The honeycomb structure of the present invention is such that: the honeycomb substrate is composed of partition walls forming a plurality of cells and an outer side face; the entire outer portion is impregnated with a resin composition; and the impregnation depth of the resin composition corresponds to the thickness of the outer portion or at least a part of the resin composition reaches the adjacent cell partition wall.

The honeycomb substrate is such that the partition walls form a large number of through holes (cells) extending from one end face toward the other end face, and these cells collectively form a honeycomb-shaped structure.

The honeycomb structure is classified into two types on the basis of its structural feature: a flow-through type (flow-through honeycomb); and a wall-flow type (wall-flow honeycomb). The flow-through type includes a large number of through holes each end of which is not plugged, the through holes having ends each open from one open-end face to the other open-end face, and is widely used for oxidation catalysts, reduction catalysts, and three-way catalysts. By contrast, the wall-flow type has through holes in which one end and the other ends thereof are alternately plugged, and is thereby able to filter solid components in exhaust gas such as soot and soluble organic fractions (SOF), and thus is used as a DPF. The present invention is available for use in both types, however, in the GPF, the through hole ends are plugged, and therefore, catalyst slurry can easily leach out to the outer portion when producing a catalyst. For the GPF that requires to prevent this, in the present invention, a wall-flow honeycomb that has a porous outer portion as with partition walls is suitably used.

The partition walls that form the honeycomb is formed of a porous material in order to allow exhaust gas to discharge to the outside. A preferred ceramic material that is normally used as a porous material is composed of an inorganic oxide such as silicon carbide, silicon-silicon carbide-based composite material, cordierite, mullite, alumina, silica-alumina, spinel, silicon carbide-cordierite-based composite material, lithium aluminum silicate, and aluminum titanate. Among these materials, cordierite is particularly preferred. This is because when the material of the honeycomb substrate is cordierite, the honeycomb structure has a small thermal expansion coefficient and excellent thermal shock resistance can be obtained.

In addition, it is preferable that the partition walls and the outer portion are formed of a material of the same quality. A material of the same quality here means a material that falls in a range of difference in thermal expansion coefficient and in porosity to such an extent that cracking due to thermal shock can be prevented. Furthermore, it is preferable that the partition walls and the outer portion are produced by means of integral molding using the same material. This enables efficient production and problems due to differences in materials can be avoided in this manner. For the catalyst for gasoline engines, the temperature of which can get high, there is a concern over the problem that cracking occurs due to a difference in the thermal expansion coefficient. Therefore, it is preferable that the partition walls and the outer portion have the same thermal expansion coefficient or are integrally molded.

The material of the plugged portions is preferably the same material as that of the honeycomb substrate. Note that the material of the plugged portions and the material of the honeycomb substrate may be the same material or different materials.

The partition walls and the outer portion preferably have a large number of pores therein. Characteristics of such pores are represented also as pore volume and average pore diameter and can be measured with a various kinds of methods, such as gas adsorption method, Archimedes' method, and mercury porosimetry method. In the present invention, unless otherwise particularly specified, values obtained by measuring with mercury porosimetry method at mercury pressure 400 MPa are meant.

The honeycomb structure of the present invention is effective when the pore volume of the cell partition walls and the outer portion is 0.3 to 1.6 ml/g, and the pore volume preferably 0.8 to 1.6 ml/g, and more preferably 1.0 to 1.6 ml/g.

The total length of the honeycomb substrate is, but not particularly limited to 50 to 300 mm, and preferably 100 to 200 mm. The end face width of the honeycomb substrate is, but not particularly limited to 50 to 200 mm, and preferably 80 to 150 mm.

The thickness of the cell wall (partition wall) is preferably 1 to 18 mil (0.025 to 0.47 mm), and more preferably 6 to 12 mil (0.16 to 0.32 mm). The structure having a thickness within this range will not become fragile and have geometric surface area of the cells not reduced, and thus will not decrease the effective usage rate of the catalyst.

The outer peripheral wall of the honeycomb substrate preferably has a thickness of 300 to 1,000 μm, and particularly preferably 500 to 800 μm. When the thickness of the outer peripheral wall is 300 μm or more, sufficient strength can be obtained, and when the thickness of the outer peripheral wall is 1,000 μm or less, pressure loss of the honeycomb structure can be suppressed and a sufficient level of engine output can be obtained when used as a GPF.

Normally, the diameter or one side of the cell of such a honeycomb substrate is approximately 0.8 to 2.5 mm. The density of the honeycomb structure, which is also known as cell density, is represented by the number of holes per unit sectional area, and is, but not particularly limited to, 100 to 1,200 cells/inch$^2$ (15.5 to 186 cells/cm$^2$). More preferably, the cell density is 150 to 600 cells/inch$^2$ (23 to 93 cells/cm$^2$), and further preferably 200 to 400 cells/inch$^2$ (31 to 62 cells/cm$^2$). In a structure having the cell density of 100 to 1,200 cells/inch$^2$, clogging due to a catalyst component or a solid substance in exhaust gas is very unlikely to occur, and usability thereof as an exhaust gas purification catalyst can be maintained without getting the effective usage rate of the catalyst reduced.

In a TWC for gasoline-powered cars to which the honeycomb structure of the present invention is applied, the outer portion of the honeycomb substrate needs to be formed at least with a porous material. This is because at the time of producing the GPF, coating enables prevention of catalyst slurry from leaching to the outer portion, and the outer portion needs to have air permeability when used as a filter.

The partition walls and the outer portion have a large number of pores therein. Characteristics of such pores are represented also as pore volume and pore diameter and can be measured with various kinds of methods, such as gas adsorption method, Archimedes' method, and mercury porosimetry method. In the present invention, unless otherwise particularly specified, values obtained by measuring with mercury porosimetry method at mercury pressure 400 MPa are meant.

In the honeycomb structure of the present invention, it is preferable that the pore volume of the cell partition walls and the outer portion is 0.3 to 1.6 ml/g, and the average pore diameter of the cell partition walls and the outer portion is 10 to 25 μm. The average pore diameter is more preferably 15 to 25 μm. When the average pore diameter of the honeycomb structure is 10 μm or more, pressure loss of the honeycomb structure can be suppressed and a sufficient level of engine output can be obtained when used as a GPF. When the average pore diameter of the honeycomb structure is 25 μm or less, sufficient strength can be obtained.

The characteristics of such pores can also be represented as a porosity (pore volume ratio). The porosity of the honeycomb structure in the present invention means a percentage that pore volume occupies the geometric volume of a porous material, which is obtained based on the thicknesses and lengths of the partition walls of the cells and the outer portion, and the cell density. The porosity in the present invention is 50 to 80%, preferably 60 to 80%, and more preferably 60 to 70%.

The shape of the honeycomb structure is not particularly limited and may be a generally known circular cylinder shape, an elliptic-cylinder shape that is similar to a circular cylinder shape, or a polygonal cylinder shape and the like. The preferred shape is a circular cylinder shape or an elliptic-cylinder shape.

That is to say, since the honeycomb structure can undergo impregnation coating of a resin composition using one or more rollers and the coating is performed on the outer portion, if the sectional shape of the honeycomb structure is a circular shape, the coating film can easily be formed in a uniform manner, and the coating film can also be formed on a honeycomb structure having an elliptic sectional shape. Moreover, the surface of the outer portion of the honeycomb structure may be roughened or may be chemically treated, in advance, to make it easier to form a film thereon. This type of impregnation coating with use of a roller will be described in detail later.

Also, the shape of the cell in a cross-section perpendicular to a longitudinal direction of the honeycomb substrate (hereinafter, referred to as "cell shape") is not particularly limited, but a polygonal shape such as a quadrangular shape, a hexagonal shape, and an octagonal shape, or a combination of these, such as a combination of a quadrangular shape and an octagonal shape, is preferred.

Here, the external appearance of the honeycomb structure according to the present invention will be described with reference to FIG. 1, and the longitudinal sectional view thereof will be described with reference to FIG. 2. A honeycomb structure 1 includes a honeycomb substrate 2 and a resin coated part 3. The resin coated part 3 represents outer peripheral walls 6 impregnated with a resin composition 8, or the outer peripheral walls 6 and partition walls 4. The honeycomb substrate 2 has porous partition walls 4 that partition and form a plurality of cells 5 extending from an inlet end face 11 serving as a fluid inlet side to an outlet end face 12 serving as a fluid outlet side, and a porous outer portion (outer peripheral wall) 6 integrally formed with the partition walls 4.

Here, "integrally formed" means that the partition walls 4 and the outer peripheral wall 6 are simultaneously extrusion-molded in the production process of the honeycomb substrate 2, and the partition walls 4 and the outer peripheral wall 6 are integrally formed as a molded body immediately after extrusion-molding. In the present invention, it is preferred that the partition walls 4 and the outer peripheral wall 6 are integrally formed. However, suitable use thereof is still possible even if they are not formed integrally as long as the outer peripheral wall 6 is formed of a porous material as with the partition walls 4 and has air permeability as with the partition walls 4. In the honeycomb substrate 2 obtained by firing such a molded body, the overall porosity thereof, that is, the porosity of the partition walls 4 and the porosity of the outer peripheral wall 6 are the same.

The resin coated part 3 is formed on the entire outer surface of the outer peripheral wall 6 of the honeycomb substrate 2 by bringing the resin composition (sealer) into contact therewith. The resin coated part 3 includes not only the outer surface of the outer peripheral wall 6 but also the resin composition 8 impregnated into the pores. In the present invention, the honeycomb substrate is impregnated with the resin composition in a slurry state with a medium such as water, and after drying or curing, the resin composition becomes the resin coated part. In this manner, since most of the resin composition is impregnated from the pores on the outer portion surface towards the inner cells, the amount of the resin composition finally remaining on the outer portion surface may be very small in some cases.

The solution of the resin composition serving as such a sealer may contain some inorganic particles for the purpose of adjusting dispersibility and viscosity. However, if a large amount of inorganic particles are contained, when heat is applied at the time of catalyst production or when mounted and used on an car as described later, the difference in thermal expansion coefficient between the partition walls 4 and the outer peripheral wall 6 becomes large and occurrence of cracking may be promoted, or air permeability may be impaired in the outer peripheral wall 6, resulting in pressure loss of exhaust gas and a reduction in the output in some cases. Therefore, the amount of inorganic particles is preferably 10% by mass or less, more preferably 5% by mass or less in the resin composition solution, and more preferably no inorganic particles are contained at all. Such inorganic particles are not limited to those contained in the inorganic particles in the resin composition 8. The same applies to components such as silicone which is made into inorganic particles as a result of drying and/or firing in the production process of the catalyst, or due to heat history in the state of being mounted on the car.

In the present invention, the resin composition to be impregnated into the outer peripheral wall 6 is not limited by the type of resin, and polyvinyl alcohol (PVA), acrylic resin, acrylic silicone resin, acrylic styrene resin, vinyl acetate resin, polyurethane resin, polyethylene glycol (PEG), agar, gelatin, starch, sucrose, wax and the like can be used as the resin composition.

Of these resins, PVA, acrylic resin, or wax is preferable, and PVA is most preferable. PVA of various polymerization degrees and grades can be easily sourced from the market, and PVA makes impregnation coating on the outer peripheral wall 6 easy and also makes combustion removal thereof described later by means of heat application at the time of catalyst production easy. While not particularly limited in the invention, a PVA of an average polymerization degree 500 to 4,000 can be used as such a PVA. Moreover, a PVA of an average polymerization degree 1,000 to 3,000 is preferable, and a PVA of an average polymerization degree 1,500 to 2,500 is even more preferable.

In the honeycomb structure of the present invention, it is preferable that the resin coated part 3 does not contain inorganic particles. In the case where the outer circumferential surface of the honeycomb is subjected to barcoding processing by means of laser marking or the like for the purpose of product management, a base coating may be prepared with titania on the surface of the outer peripheral wall 6 in some cases. Even in this type of case, since titania is an inorganic component, it is not advisable to impregnate it into the pores of the outer peripheral wall 6.

Therefore, in the case where a base coating is prepared with titania on the surface of the outer peripheral wall 6, the particle diameter of titania is preferably equal to or larger than the pores 7 of the outer peripheral wall 6. If the inorganic particles of titania or the like is larger than the pore diameter of the pores 7, impregnation of the inorganic particles into the outer peripheral wall 6 is eliminated, and occurrence of cracking due to various heat histories can be suppressed.

When preparing such a base coating, a binder is used in some cases for the purpose of improving the adhesion between the base coating material and the outer peripheral wall 6. Examples of such a binder include silica sol. When a binder is used, it is preferable that the binder is preliminarily mixed with inorganic particles such as titania particles and use thereof is kept to the minimum necessary for attaining adhesion between the surface of the inorganic particles of titania or the like and the surface of the outer peripheral wall 6, so that impregnation does not come to a state where the pores 7 inside the outer peripheral wall 6 are filled with the binder component.

Figure 2:
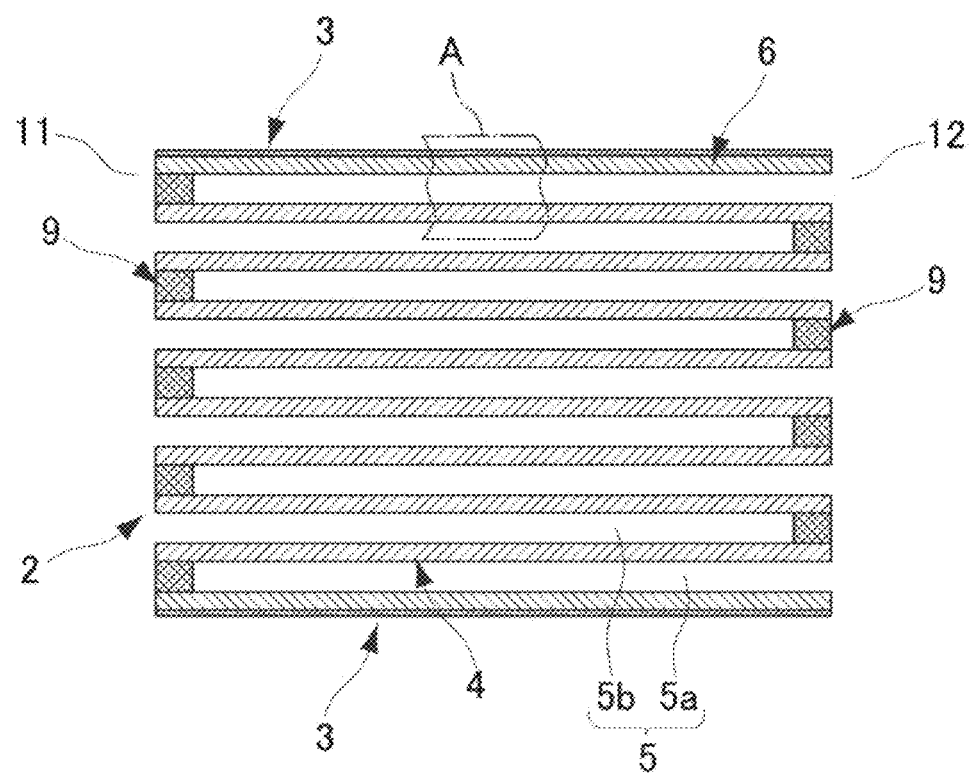
FIG. 2 is a longitudinal sectional view schematically showing a state of the honeycomb structure of the present invention being oriented laterally.

In FIG. 1 and FIG. 2, there is shown an example of the case where the honeycomb structure 1 is used for a PM collecting filter such as GPF, and accordingly, the cell 5a has a plugged portion 9 formed at the open end on the inlet end face 11 side and the adjacent cell 5b has a plugged portion 9 formed at the open end on the outlet end face 12 side.

By alternately providing the plugged portions 9 at the open ends of the cells 5 of the honeycomb substrate 2 in this manner, the honeycomb structure 1 becomes a wall-flow type filter having high PM collection efficiency. In this wall-flow type filter, exhaust gas flowing into the cells 5 from the inlet end face 11 passes through the partition walls 4 and then flows out from the outlet end face 12 to the outside of the cells 5. When the exhaust gas passes through the partition wall 4, the partition wall 4 functions as a filtration layer and collect PM contained in the exhaust gas.

On the inlet end face 11 and the outlet end face 12, the plugged portions 9 are formed preferably in a checkered pattern in which the cells 5 with plugged open ends and the cells 5 with non-plugged open ends are alternating. However, the embodiment of the present invention is not limited to such a wall-flow type filter, and can also be applied to a wall-flow type filter in which only one of the inlet end face 11 and the outlet end face 12 is plugged.

Figure 3:
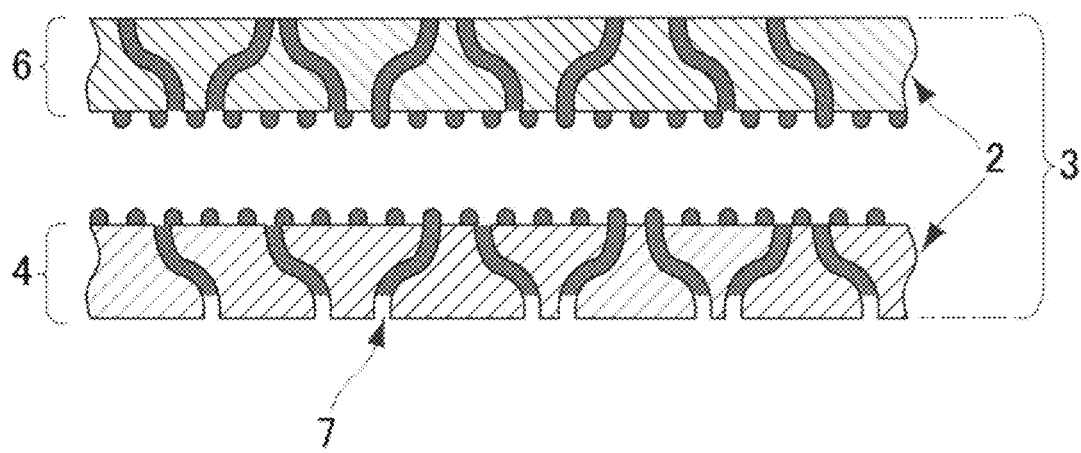
FIG. 3 is an explanatory diagram showing an impregnation depth of a resin composition on the honeycomb structure, magnifying the part A in FIG. 2.

In the present invention, as shown in FIG. 3, in the resin coated part 3, the resin composition 8 is completely impregnated into the pores 7 of the outer peripheral wall 6. Here, an example is shown in which the resin composition 8 is impregnated beyond the outer peripheral wall 6 of the honeycomb substrate 2 and is impregnated also into the partition wall 4 adjacent to the outer peripheral wall 6.

The resin composition 8 is impregnated even into a part of the partition walls in this manner, because sealing the outer peripheral wall 6 reliably is prioritized in the present invention. In the present invention, the impregnation depth corresponds to the outer portion thickness, and in the embodiment, it is not always necessary to impregnate the resin composition 8 into the partition walls 4. However, in order to reliably impregnate the outer peripheral wall 6 with the resin composition 8, it is preferable to perform impregnation coating to such an extent that the resin composition 8 is impregnated even into approximately one to three cells in the direction of the adjacent partition wall 4. When the impregnation treatment is performed even to the partition wall 4 of the cell, the impregnation depth thereof is preferably 2 to 6 mm including the thickness of the outer peripheral wall 6. That is to say, if the size (the total length in the axial direction) of the honeycomb substrate is as comparatively small as 200 mm or less, the depth is set preferably to 4 mm or less, and if the size is comparatively large and exceeds 200 mm, the depth is set preferably to 6 mm or less.

As shown in FIG. 3, a very small part of the resin composition 8 may form a very thin layer on the honeycomb surface, or all of the resin composition 8 may penetrate into the outer peripheral wall 6 and at least a part thereof impregnates even to the partition wall 4 so that the resin composition 8 may not form a layer on the surface. If the resin composition 8 does not form a layer on the surface, the external dimensions of the honeycomb structure does not change even after drying and curing, so that the operation of removing an excessive layer becomes unnecessary in the catalyzation step.

In the present invention, such a state where the majority of the resin composition is impregnated into the pores of the outer peripheral wall, or a state of the outer portion where the resin composition is impregnated into the pores of the outer peripheral wall and a slight amount of the resin can be present also on the surface, are collectively referred to as resin coated part.

The resin composition preferably has a coating amount of 8 g/L or more per volume of the honeycomb structure. Here, the coating amount is the mass of the resin component constituting the resin coated part per volume of the honeycomb structure. The coating amount is more preferably 8 to 30 g/L per volume of the honeycomb structure, and is further preferably 8 to 20 g/L per volume of the honeycomb structure.

As described above, in the present invention, the resin composition is impregnated into the whole area inside the pores 7 of the outer peripheral wall 6 of the honeycomb structure 1, and with a predetermined coating amount, blocks the pores 7 of the outer peripheral wall 6. Therefore, even when the catalyst slurry is introduced into the cells 5 in order for the partition walls 4 of the honeycomb structure 1 to make the catalyst supported thereon, the catalyst slurry is unable to enter the pores of the outer peripheral wall 6. As a result, the catalyst slurry does not leach out to the outer surface, and excellent workability can be obtained in the step of having the partition walls 4 of the honeycomb structure 1 to make the catalyst supported thereon.

Also, since the resin coated part 3 containing the resin reinforces the outer peripheral wall 6, by chucking (grasping) a part of the outer peripheral wall 6 having an improved strength in the process of making the catalyst supported on the honeycomb structure 1, damage to the outer peripheral wall 6 can be effectively prevented. Furthermore, as a result of the improved strength of the outer peripheral wall 6, the isostatic strength of the entire honeycomb structure 1 is also improved, and damage to the honeycomb structure 1 can also be effectively prevented during transport.

Figure 4:
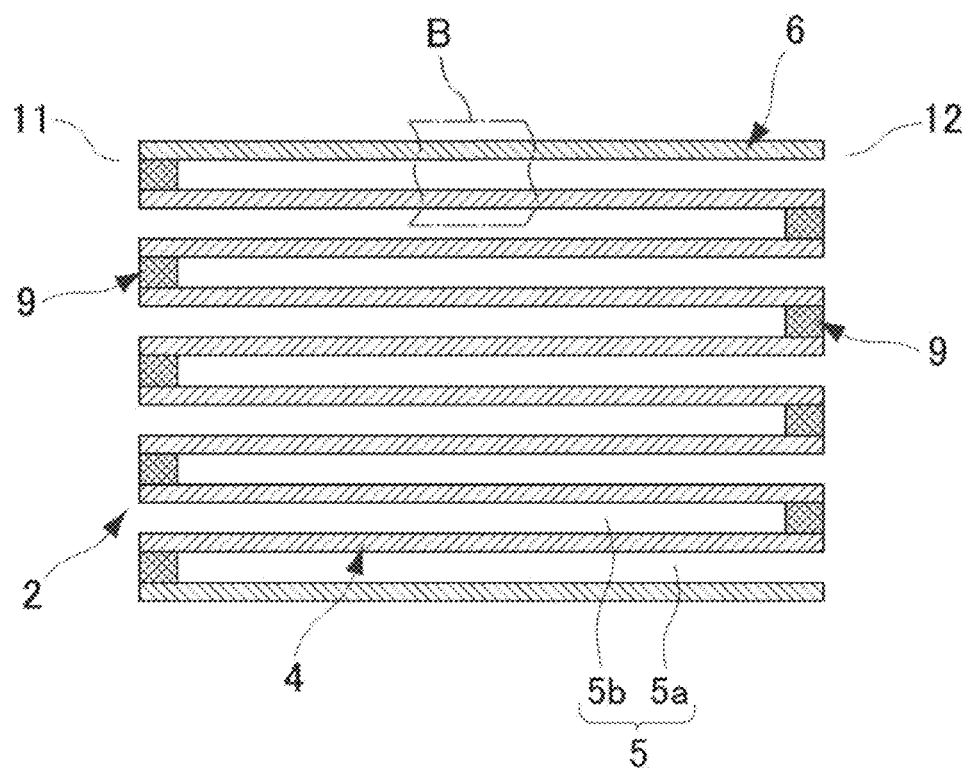
FIG. 4 is a longitudinal sectional view schematically showing a state of a honeycomb structure type catalyst of the present invention being oriented laterally.

Furthermore, the resin composition 8 is present inside the outer peripheral wall 6 when coating with the catalyst, but it is burned off by the subsequent heat application, so that the pores in the outer peripheral wall 6 are unblocked as shown in FIG. 4 and increase in pressure loss can be suppressed when mounted on a car. In addition, since the catalyst composition 13 (slurry) is not present in the outer peripheral wall 6, the thermal expansion coefficient of the outer peripheral wall 6 remains unchanged, and it is possible to suppress occurrence of cracking due to heat application during the catalyst production and heat history during traveling of the car.

Unlike the present invention, in those cases where the resin composition 8 is impregnated only into part of the outer circumferential wall 6 or where the impregnation is incomplete, the catalyst slurry penetrates into the outer peripheral wall 6 and blocks the pores, thereby causing a pressure loss or promoting cracking due to various heat histories. For example, in Patent Literature 7, the thickness of the portion of the coating layer where the resin composition penetrates into the pores of the outer peripheral wall is 1 to 90% of the thickness of the outer peripheral wall, and is particularly preferably 15 to 50%. When the thickness of the portion of the coating layer where the resin composition penetrates into the pores of the outer peripheral wall is 90% or less as in Patent Document 7, which is thinner than that in the present invention, such pressure loss and cracking due to heat history are more likely to occur.

Further, in the present invention, since the resin composition is completely impregnated in the pores 7 of the outer peripheral wall 6 and a part thereof reaches the partition walls, visual confirmation of the impregnation state can be easily performed. Since no observation needs to be performed by means of an SEM (scanning electron microscope), time and effort can be saved and it is advantageous in terms of quality control.

However, if the resin composition solution is transparent, the state of impregnation at the time of coating must be confirmed by checking whether or not the honeycomb is wet, and after the solution becomes dry, it becomes even more difficult to make a distinction from the portions that have not been impregnated in some cases. In order to confirm the state of impregnation of the resin coated part 3 more easily, it is preferable to preliminarily color the resin composition solution.

As described above, in the honeycomb structure of the present invention, it is preferable that the outer peripheral wall of the honeycomb substrate is integrally formed with the partition walls, but it may be formed separately from the partition walls. Here, "formed separately from the partition walls" means that in the process of producing the honeycomb substrate, formation of the portion that serves as the outer peripheral wall of the honeycomb substrate is performed after formation of the portion that servers as the partition walls.

In the case where the outer peripheral wall of the honeycomb substrate is formed separately from the partition walls, the porosity of the outer peripheral wall and the porosity of the partition walls may be the same or different. Also, the average pore diameter of the outer peripheral wall and the average pore diameter of the partition walls may be the same or different, and the material of the outer peripheral wall may be the same as or different from the material of the partition walls. Note that the "porosity" and the "average pore diameter" mentioned here are values measured by a mercury porosimeter.

However, in either case, if the thermal expansion coefficients are the same, the porosity of the outer peripheral wall is preferably 50% or more. The GPF in which a catalyst is supported on such a honeycomb structure with a high porosity for use is a typical application thereof. The honeycomb structure of the present invention can be widely used not only for such a GPF but also for various filters, catalyst carriers and the like.

2. Method for Producing a Honeycomb Substrate

While the honeycomb substrate serving as a material of the honeycomb structure of the present invention can be sourced from the market, it can be produced by a known method, an example of which is shown below.

The honeycomb substrate is produced from a molding material that contains a ceramic material. The ceramic material is selected from a group consisting of silicon carbide, silicon-silicon carbide-based composite material, cordierite material that is fired to become cordierite, mullite, alumina, silica-alumina, spinel, silicon carbide-cordierite-based composite material, lithium aluminum silicate, and aluminum titanate. Among these materials, the cordierite raw materials having a small thermal expansion coefficient and excellent thermal shock resistance, that is, ceramic materials blended so as to have a chemical composition that falls in a range where silica: 42 to 56% by mass, alumina: 30 to 45% by mass, and magnesia: 12 to 16% by mass, are preferred.

The molding material is prepared by mixing the above ceramic materials with a dispersion medium, an organic binder, an inorganic binder, a pore former, a surfactant and so forth. The composition ratio of each material is set to a composition ratio suitable for the structure, material, and so forth of the honeycomb substrate to be produced.

Next, the molding material is kneaded to form a green body. Examples of a preferred method of kneading the molding material to form a green body include a method using a kneader, a vacuum kneader or the like.

Thereafter, a honeycomb molded body in which partition walls and an outer peripheral wall are integrated with each other is extruded from the green body, using a spinneret with grid-patterned slits formed therein, and the honeycomb molded body is then dried. Examples of suitable drying methods include, heated-air drying, microwave drying, dielectric drying, reduced-pressure drying, vacuum drying, and freeze drying, and it is preferable that dielectric drying, microwave drying, or heated-air drying are performed independently or in combination thereof.

Subsequently, the dried honeycomb molded body (dried honeycomb body) is fired to obtain a honeycomb substrate. Prior to this firing (main firing), it is preferable to perform preliminary firing (defatting) in order to remove the binder and the like contained in the honeycomb molded body. Any condition is sufficient as the condition for the preliminary firing as long as the organic substances (such as organic binder, surfactant, and pore former) contained in the honeycomb molded body can be removed therefrom. In general, the combustion temperature for organic binders is approximately 100 to 300° C. and the combustion temperature for pore formers is approximately 200 to 800° C. Therefore, as the preliminary firing condition, it is preferable that a heat application is performed in an oxidizing atmosphere at approximately 200 to 1,000° C. for approximately 3 to 100 hours.

The conditions (temperature, duration, atmosphere, and so forth) for firing (main firing) a honeycomb molded body differ depending on the type of molding material used, and an appropriate condition is selected according to that type. For example, when a cordierite material is used, the firing temperature is preferably 1,410 to 1,440° C. In addition, the firing duration is preferably approximately 4 to 8 hours as a length of time for which the firing temperature is kept at the maximum temperature. Examples of a preferred apparatus for performing main firing and preliminary firing include an electric furnace and a gas furnace.

In order to form plugged portions in the honeycomb substrate, a sheet is first attached to an end face of the produced honeycomb substrate. Then, holes are drilled at positions on the sheet corresponding to the cells at which the plugging portions are to be formed. Next, while the sheet is attached, the end face of the honeycomb substrate is immersed in the plugging slurry, which is a slurried material for forming plugged portions, and the plugging slurry is filled into the open ends of the cells to be plugged, through the holes made in the sheet. After having dried the plugging slurry that has been filled this way, it is fired and cured to form plugged portions. It is preferable to use the same material as the material for forming the honeycomb substrate as a material for forming the plugged portions. Note that the plugged portions may be formed at any stage after the honeycomb molded body has been dried, after the preliminary firing or after the firing (main firing).

As described above, the honeycomb itself is obtained by firing it at an extremely high temperature exceeding 1,000° C., and as a result, the honeycomb is also extremely stable at the firing temperature at the time of catalyst production in the present invention or in the heat history when mounted on a car.

Incidentally, Patent Literature 4 describes that it is preferable to reinforce corners of the honeycomb with a resin prior to the firing step after a thin wall honeycomb has been molded by extrusion. However, in patent Literature 4, there is no description on preventing impregnation of the catalyst composition by providing a resin coated part in which the resin composition is impregnated to a predetermined depth of a special honeycomb structure as described in the present application, and accordingly, issues with thermal shocks and pressure loss cannot be resolved.

3. Method for Producing a Honeycomb Structure (Impregnation with a Resin Composition)

The present invention is a method for producing a honeycomb structure by: attaching a coating liquid containing a resin composition on an outer portion of a honeycomb substrate having partition walls that form a plurality of cells and the outer portion serving as an outer face thereof; sufficiently impregnating the resin composition into pores; and then drying and curing it.

First, a resin composition solution to be coated on the outer peripheral wall of the honeycomb substrate is prepared. The resin composition solution of the coating liquid is composed of a resin component, a solvent, and arbitrary additives.

Examples of the resin component include polyvinyl alcohol (PVA), polyethylene glycol (PEG), agar, gelatin, starch, and sucrose, each of which solidifies when dried. These resin components are preferably used in a form of emulsion in which polymers are dispersed or dissolved in a water solvent. Such a resin composition can be solutionized simply by dissolving it in a solvent such as water. Moreover, the molecular weight of the resin composition is not particularly limited, and a hydrophilic component or a reactive component for during need not be blended.

Besides water, an alcohol such as ethanol and isopropyl alcohol, organic solvents such as toluene and xylene can be used as a solvent for solutionizing the resin. Among these solvents, water is most preferred. Water can be handled easily in production and no local ventilation facility is required unlike volatile organic solvents.

It is necessary that organic resin accounts for 1 to 50% by mass of the whole emulsion, preferably 3 to 40% by mass. If the concentration of the organic resin is less than 1% by mass or greater than 50% by mass of the whole emulsion, impregnation of the honeycomb substrate with the organic resin into the outer peripheral wall 6 may become inappropriate in some cases irrespective of the type of the resin used.

In the case where water is used as a solvent and the organic resin used is a PVA, an emulsion can be prepared in a range of 1 to 50% by mass, but the concentration of the PVA is preferably 2 to 10% by mass, and is even more preferably 3 to 7% by mass. For example, when a PVA having a polymerization degree of 500 to 4,000 is applied to the honeycomb substrate as an aqueous solution having the above concentration, impregnation to the outer peripheral wall 6 is easy and excessively deep impregnation to the partition walls 4 toward the honeycomb center axis direction would not be performed.

In the present invention, it is desirable to adjust the resin composition solution to be used to a specific viscosity. When assuming that the average pore diameter of the honeycomb structure and the contact angle and the surface tension of the resin composition are constant, Lucas-Washburn equation is considered applicable, in which the impregnation depth is proportional to the square root of the reciprocal of the viscosity, and the impregnation depth can be controlled by the viscosity.

The preferable impregnation depth can be appropriately adjusted according to the type and size of the honeycomb structure used, but since the impregnation depth should be slightly greater than the thickness of the outer portion, the viscosity range is preferably 5 to 1,000 mPa·s, and is even more preferably 10 to 500 mPa·s. This viscosity is a value measured using a Brookfield type viscometer at 25° C. at a shear velocity of 6.65/sec, and the same shall apply hereinafter unless otherwise specified in the present invention. The viscosity of the resin composition can be adjusted by adjusting average polymerization degree, additives, concentration, temperature, and so forth.

In the case where a PVA is used as the organic resin and water is used as the solvent, the concentration of the PVA is desirably adjusted to a preferable range in consideration of the polymerization degree of the PVA. That is to say, even with the same concentration, a PVA having a very low polymerization degree tends to have a low viscosity as an aqueous solution, and a PVA having a very high polymerization degree tends to have a high viscosity. Therefore, in the case where a PVA having a high polymerization degree is employed, it is necessary to reduce the concentration thereof, whereas in the case where a PVA having a low polymerization degree is employed, it is necessary to increase the concentration thereof.

Based on these tendencies, when a PVA having an average polymerization degree of 1,500 to 2,500 is used, the concentration as an aqueous solution is preferably 2 to 10% by mass, and is even more preferably 3 to 7% by mass.

When the PVA concentration is too low, blocking of the pores of the outer peripheral wall becomes incomplete, the PVA solution penetrates deeply in the axial direction of the honeycomb substrate and does not stop at the cell wall, and the catalyst slurry may not impregnate into the pores of the cell wall in some cases. On the other hand, if the PVA concentration is too high, it is difficult to impregnate it into the pores in the outer peripheral wall, and the PVA solution shows a strong adhesiveness, which may make the coating application of the PVA solution difficult in some cases. In the present invention, it is preferable to use a coating roller (a rotating body) as a coating apparatus. However, if the PVA concentration is too high, the honeycomb substrate and the rotating body may bond with each other and rotation coating may become impossible in some cases.

Furthermore, here is considered an influence of temperature changes and viscosity changes on the coatability at the preferred average polymerization degree and concentration of the PVA. When the PVA concentration is high, the viscosity increases as the temperature decreases, resulting in the reduced coatability, and the same issue as that in the case with a high concentration described above may occur in the coating application in some cases. On the other hand, when the PVA concentration is low, significant changes are unlikely to occur in the viscosity with respect to the temperature changes and handling of the process easy.

For example, even in the case where the PVA aqueous solution has a concentration of more than 8% by mass and a viscosity of approximately 300 mPa·s at 35° C., the viscosity may increase to 800 mPa·s when the temperature decreases to 10° C. Since the viscosity changes in this manner with respect to temperature changes, the degree of resin impregnation into the outer portion of the honeycomb structure to be produced is significantly affected by the difference in the temperature at the time of production between summer and winter, and stable production may become difficult in some cases.

On the other hand, when the PVA concentration is 7% by mass, the viscosity at 35° C. is approximately 100 mPa·s. However, even when the temperature decreases to 10° C., the viscosity changes only moderately to approximately 200 mPa·s, and a reliable and appropriate coating application is possible even for an apparatus that uses a coating roller (a rotating body). The changes in viscosity associated with the decrease in temperature tends to be unsusceptible in such a case where the PVA concentration is lowered, and the coating application of the PVA solution is stable.

As the resin component of the coating liquid, other than the above, organic resins such as acrylic resin, acrylic silicone resin, acrylic styrene resin, vinyl acetate resin or polyurethane resin may be used.

In such a resin composition, as long as it can be solutionized simply by dissolving it in a solvent such as water, the molecular weight of the resin composition is not particularly limited, and a hydrophilic component or a reactive component for curing need not be blended.

However, a resin composition using a component the double bond portion of which reacts and cures upon heat application, and a resin composition using a component that reacts and cures upon ultraviolet ray irradiation are not preferable, because they need to be cured by applying heat or irradiating light thereto after having been impregnated to the honeycomb structure, and facilities and processing steps become complicated and costly.

Also, in the case where a material that is mainly composed of an organic resin that is solid in normal temperatures, such as wax and organic pigment, which each have a large molecule weight and having no hydrophile, is used as the resin component, these materials are difficult to apply to the honeycomb as they are in some cases. When a film forming component is not easy to enter the inside of the macro pores from the outer portion of the honeycomb, uneven coating occurs, whereby leaching out of slurry is sometimes difficult to be prevented. However, it is possible to use such material in some form, by being heated and dispersed or dissolved in water or in an organic solvent, for example.

Since the impregnation depth to the outer portion is controlled by selecting the type of the organic resin and appropriately adjusting the viscosity, the area where the catalyst composition can adhere to the partition walls does not become reduced when the honeycomb structure is later coated with the slurry of the catalyst composition.

While using water as a solvent is safe and low in cost, an organic solvent such as alcohol may also be used. Considering easiness for subsequent drying/curing and safeness, it is preferable to use ethanol, the boiling point of which is low.

Other than the resin component and water, additives such as a dispersant, a preservative, and a pH adjuster can be added to the aqueous solution of the resin composition, depending on the type of the resin component used. Further, it may suitably contain a resin varnish, a thickener, a wetting agent, a film-forming aid, a curing agent, a coloring agent and the like.

Examples of resin varnish include aqueous shellac varnish, aqueous casein varnish, aqueous rosin-maleic acid resin varnish, aqueous polyester resin varnish, and water-soluble cellulose varnish.

Examples of thickener include methylcellulose, hydroxyethyl cellulose, and polyurethane resin; examples of wetting agent include alkyl alcohol ethylene oxide adduct; and examples of the film-forming aid include 2,2,4-trimethyl-1, 3-pentanediol, di-propylene glycol n-butyl ether, propylene glycol n-butyl ether, and polypropylene glycol monomethyl ether.

Note that the above organic resin solution may contain a small amount of an inorganic filler. While titania, alumina, silica or the like may be contained as an inorganic filler, it is preferable that the total amounts of organic resin that adheres to the honeycomb structure outer surface and organic resin that is included in the macro pores from the cell outer portion accounts for at least 90% by mass of the whole material. Therefore, it is preferable that the amount of the inorganic filler is 10% by mass or less, preferably 5% by mass or less. If the amount of inorganic filler is large enough to exceed 10% by mass, the inorganic filler that has entered in the macro pores in the cells sometimes remains even after making a catalyst supported and reduces the size of the pores, leading to pressure loss or a cracking. It is preferable that the organic resin solution does not contain any inorganic filler if there is a concern of this type.

Next, this resin composition solution is applied to the outer surface of the outer peripheral wall of the honeycomb substrate and is impregnated thereto. Application of such a resin composition solution is not particularly limited, but when applying the resin composition solution, by bringing a roller into contact with the coating application site, the slurry containing the organic resin can penetrate into the pores in the entire outer peripheral wall, thereby enabling complete impregnation to the outer peripheral wall. When forming the resin coated part with such a coating liquid, in order to ensure reliable formation of the resin coated part, the resin coated part may be formed by impregnating the resin composition solution not only to the outer peripheral wall but also to the inner side partition wall in the axial direction from the cell adjacent to the outer peripheral wall.

In the present invention, the resin composition is applied to the entire outer surface (the entire area) of the outer peripheral wall of the honeycomb substrate. Unless the coating is applied to the entire outer surface, a difference in expansion coefficient occurs between a portion impregnated with a predetermined amount of the resin and a portion insufficiently impregnated with the resin, and cracking due to various heat histories is likely to be induced. Cracking is also induced in the same manner in the honeycomb after having been catalyzed. In addition, if there is a portion that is partly not impregnated with the resin composition (a non-impregnated portion), the catalyst slurry may leach out from the non-impregnated portion when catalyzing the honeycomb structure, resulting in wasting the catalyst that uses noble metals and in the reduced workability in the catalyst supporting step in some cases.

In the present invention, while the method of impregnating and coating the honeycomb substrate with a resin composition is not particularly limited, impregnation and coating can be performed by bringing a porous roller impregnated with a resin composition solution into rotational contact with the outer portion of the honeycomb substrate. As an example of this, the roller that comes into contact with the coating application site has a driving function to rotate the honeycomb substrate and/or a coating application function to apply the coating liquid onto the outer portion.

That is to say, in the present invention, it is preferable to use a roller having a driving function as well as a coating application function ("driving/coating application roller"), or to use a combination of a roller having a driving function ("driving roller") and a roller having a coating application function ("coating application roller").

While the coating application roller is not limited in terms of a material, a roller having the outermost surface formed of a sponge-like material is preferable. For the sponge-like material, as is the case with the above, polyurethane foam, polyvinyl alcohol, the cellulose-based, the rubber-based, the silicon-based, or an unwoven fabric is suitably usable.

A coating application roller the section of which has a circular shape, although there may be possibly some limitations in connection with the shape of the honeycomb substrate, normally is easy to apply the coating liquid evenly, and a coating application roller having an ellipse-shaped section also enables coating application of the coating liquid.

Moreover, it is preferable that the application roller has a length equal to or a little larger than the size of the honeycomb substrate. If the coating application roller is shorter than the honeycomb substrate, coating application is performed only on a part of the honeycomb substrate.

The coating liquid has the resin component having a large molecule weight and the precursor thereof is also difficult to apply singly, and therefore the resin component is dispersed or dissolved in a solvent when used.

In order to form an outer coat film on the honeycomb substrate using the coating liquid, the honeycomb substrate is first placed on two driving/coating application rollers to bring the outer peripheral side face of the honeycomb substrate into contact with the rollers. These rollers are in a state where the lower end portion thereof is immersed in a liquid bath in which a coating liquid containing an organic resin is stored.

If at least the outermost surface of the driving/coating application rollers is formed of a sponge-like material, by immersing it in a liquid bath filled with the coating liquid, the coating liquid adheres onto the roller and forms a coating application site.

As the driving/coating application rollers rotate in this state, the honeycomb substrate also rotates, and when rotates at least once, the whole periphery of the honeycomb substrate is coated with the organic-based coating liquid depositing to the driving/coating application rollers. The number of rotations is, for example, 1 to 10 times, preferably 1 to 5 times.

In this case, the rotation speed of the driving/coating application rollers is, although depending on the roller size or the resin material type used, 0.1 to 100 rpm, for example, and is preferably 1 to 30 rpm. The lower the rotation speed is, the greater the amount of coating liquid adhered to the outer portion of the honeycomb substrate will be and the greater the amount of penetration into the pores will be, and as a result, the coating liquid is sufficiently enclosed in the pores that pass through the outer portion. If the rotation speed is further reduced, the amount of the coating liquid penetrating from the surface of the honeycomb substrate through the outer portion toward the cell increases, and the coating liquid overflowing from the pores also reaches the adjacent inner side cell wall.

Normally, the lower the concentration of the organic resin is, the easier the coating application operation will be and the greater the depth of impregnation into the honeycomb substrate will be. However, if the honeycomb substrate is sufficiently dry, the pores absorb water, which serves as a solvent, and the viscosity of the water-soluble organic resin increases. As a result, impregnation is expected not to be excessively deep as an effect.

Although the case where the organic resin is a PVA is not an exception, if the organic resin is excessively dilute, for example, being less than 1% by mass, the honeycomb substrate is impregnated excessively deep, and when it is catalyzed thereafter, the amount of catalyst supported on the cell partition wall by the catalyst slurry may decrease in some cases. In addition, blockage of the pores in the outer peripheral wall becomes incomplete, allowing the catalyst slurry to penetrate therein, and an increase may occur in thermal shock and pressure loss.

On the contrary, in the case where the amount of the organic resin is too large and the organic resin is a PVA, for example, with a liquid of a high concentration such as 10% by mass, it becomes difficult to impregnate the entire honeycomb substrate and the resin layer stays in a shallow portion on the inner side of the outer wall. Consequently, the catalyst slurry enters into the pores of the outer wall in the catalyst production process and is carried thereon, and as a result, cracking due to thermal shock, which is the problem to be solved by the present invention, becomes more likely to occur.

To control formation of such a resin coated part, the coating amount of the resin composition may be controlled. The control can be appropriately performed by adjusting, for example, the pressure for pressing the roller for applying the resin composition solution against the outer peripheral wall, the rotation speed of the roller, the porosity of the roller, the size of the pores of the roller, the duration of time for which the roller is in contact with the outer peripheral wall, and so forth.

The honeycomb substrate coated with the liquid containing the resin component then proceeds to a drying (curing) step. While the drying (curing) step is not particularly limited by the atmosphere or the temperature and the process may be performed under the atmospheric pressure or under reduced pressure at a temperature of 0 to 200° C., preferably at room temperature. The surface of the honeycomb substrate may be exposed to air, or placed under reduced pressure, as required. The temperature of the heat application is, although it depends on the type of the resin used, preferably 50 to 200° C., more preferably 100 to 180° C.

In the process of drying the honeycomb substrate, it is preferable that the applied resin component liquid is completely dried. The condition for this drying process varies depending on temperature, humidity, presence or absence of ventilation and so forth, but drying at room temperature for 2 hours or more is preferable, and drying for 5 hours or more is even more preferable.

Thereby, the resin component having the reduced moisture therein becomes a cured product (solidified product), and sets on the honeycomb structure. In this manner, there is obtained the honeycomb structure of the present invention having the resin coated part in which the resin composition is sufficiently impregnated in the pores inside the outer peripheral wall of the honeycomb substrate. On the other hand, in the case where a water insoluble resin is used, a thermoplastic wax requires a heating apparatus at the time of coating application, cooling after the coating application is gradual, and the resin gradually penetrates deeper inside the honeycomb as the temperature rises during storage. As a result, attention needs to be paid when handling the process, as the originally intended impregnation depth may change in some cases.

Although the mechanism of a resin composition impregnating into the pores in the outer peripheral wall of the honeycomb substrate and also the mechanism of a resin composition impregnating deeply enough to reach the adjacent cell partition wall have not been fully understood, it is thought to be due to the capillary phenomenon, and it is therefore possible to infer that the surface tension between the honeycomb substrate and the solvent containing the resin is related to this mechanism. In addition, the lower the solution viscosity is, the deeper the impregnation can be, and if the organic resin can disperse easily in a solvent such as water, it easily enters into the pores. Thereafter, when the resin is dried, moisture is easily eliminated to form a thin resin film inside the pores. In the solidified state, even if the catalyst composition slurry has entered the cell, the resin film is still sufficiently adhered to the honeycomb substrate, and it presumably functions to prevent the catalyst composition slurry from penetrating into the cell partition walls and the outer peripheral wall.

4. Exhaust Gas Purification Catalyst

Thereafter, the honeycomb structure of the present invention is made to support a catalyst thereon and becomes a honeycomb structure type catalyst. The honeycomb structure type catalyst is produced by attaching a catalyst slurry containing a catalyst such as a noble metal and the like to the surface and pores of the partition walls by means of a conventionally known wash coating method such as a suction method, and then firing it at 400 to 600° C. to bake the catalyst contained in the catalyst slurry on the partition walls.

In the exhaust gas purification catalyst for gasoline-powered cars, for example, the honeycomb structure serves as a carrier, and a three-way catalyst (TWC) to remove NOx, CO, and hydrocarbon is made to be supported inside the cells. The three-way catalyst (TWC) is an exhaust gas purification catalyst in which: inorganic oxide particles support active components mainly including noble metals such as platinum, palladium, and rhodium; hydrocarbon contained in exhaust gases is oxidized to provide water and carbon dioxide; carbon monoxide is oxidized to provide carbon dioxide; and nitrogen oxide is reduced to provide nitrogen, and thus the exhaust gases can be purified with a single catalyst. Note that such a catalyst may be a single TWC, but one or more catalysts may be arranged therebefore and thereafter for use with multiple catalysts.

The honeycomb structure 1 of the present invention is used by making a catalyst supported on the partition walls 4 of the honeycomb substrate 2, and the amount of the supported noble metal is preferably 0.3 to 3.5 g/L per unit volume of the honeycomb structure 1.

It is preferable that the catalyst of a noble metal or the like is preliminarily made to be supported once on a heat resistant inorganic oxide, such as alumina, having a large specific surface area, and is then made to be supported on the partition walls 4 of the honeycomb substrate 2 in a highly dispersed state. As the heat resistant inorganic oxide, ceria, zirconia, a composite oxide thereof, zeolite or the like can also be used in addition to alumina.

The noble metal catalyst supported on the inorganic particles of alumina or the like is pulverized into a predetermined particle size, mixed with an aqueous medium or the like to form a slurry, and is supported on the honeycomb in one or two layers. In the catalyst slurry, oxides containing elements such as zirconia, ceria, La, Nd, and Pr, or other substance may be blended, as a component to improve thermal resistance or as a component to store and release oxygen.

The slurry of the catalyst composition in the present invention is not limited by the particle size of the inorganic particles, but as shown in FIG. 4, it is preferable that at least a part of the slurry can penetrate into the pores of the partition wall 4. The slurry of such catalyst composition 13 is preferably microparticulated by a ball mill or the like so as to have a particle diameter D90 of 5 μm or less when the cumulative distribution from the small particle diameter side in the particle size distribution is 90%, and the more preferable particle diameter D90 is 3 μm or less. When D90 is 5 μm or less, an appropriate amount of catalyst component can enter the pores 7 of the partition walls 4. As a result, in a GPF using the wall-flow honeycomb, particulate components such as soot are also sufficiently removed together with harmful components in the exhaust gas, and no pressure loss is caused.

The basic principle of the wash coating method consists of the following two steps. A "step of introducing a slurry of a catalyst composition into the inside of cells of a honeycomb structure (hereinafter, may be referred to as "introduction step")", and a "step of removing excessive slurry of the catalyst composition slurry introduced into the cells (hereinafter, may be referred to as "removal step")". In both the introduction step and the removal step, as a common practice, an operation is performed to apply pressure to the cells of the honeycomb to perform suction and removal of the catalyst slurry.

An example of such a wash coating apparatus is disclosed in Publication of Japanese Translation of PCT Application No. 2011-529788. In the apparatus used there, the peripheral portion of a honeycomb structure is grasped with a bellows (also called "balloon") inflated with air, is immersed in an immersion pan containing a slurry that contains a catalyst component, undergoes a suction process, and is pulled out of the immersion pan. Then, air is blown to the honeycomb structure to remove excess slurry, but due to the pressure of the suction and removal operations, the slurry of the catalyst composition 13 enters the partition walls 4. After this process, the honeycomb structure is turned over, and the suction and removal operation are performed again.

When wash coating the catalyst composition slurry using the honeycomb structure of the present invention, for a wall-flow type honeycomb for a GPF, the coating amount of the catalyst composition slurry is preferably 10 to 200 [g/L] per unit volume of the honeycomb structure, and more preferably 30 to 100 [g/L]. When the catalyst amount is 10 [g/L] or more, excellent performance can be expected for purifying CO, HC and NOx along with the particulate components in exhaust gas, and if the catalyst amount is 200 [g/L] or less, it does not disturb the function as a wall-flow type honeycomb filter.

In the GPF, however, to remove fine particulate substances contained in exhaust gas, large pores (macro pores) exist in the outer wall of the honeycomb, and there are also places where the interior of the cells is communicated with the outside. In these places, the slurry liquid easily leaches out through a clearance in the outer portion.

The component of the slurry contains a viscous substance that makes it easier for the catalyst material to adhere to the inside of the cell. In the case of using the honeycomb structure not provided with the resin coated part 3 composed of the resin as in the present invention, there is a problem that a large amount of the catalyst slurry leaches out from the outer peripheral wall 6, and it bonds with the balloon that grasps the honeycomb structure in the wash coating method. Also, it becomes impossible to accurately control the amount of supported catalyst at the time of producing the catalyst, and the amount of the slurry of the catalyst composition 13 that has leached out, supported on the cell partition walls, which are surfaces favorable for exhaust gas purification in the honeycomb structure, is reduced, resulting in wasting the noble metals.

The issue of the catalyst slurry leaching out to the outer surface of the outer peripheral wall becomes prominent in a high porosity honeycomb structure having a porosity of 50% or more. In the present invention, even in the case where a honeycomb substrate having a porosity of 50 to 80% is used, since the honeycomb structure has a resin coated part containing the organic resin mentioned above, the catalyst component-containing liquid is unlikely to leach out to the outer periphery of the honeycomb structure in the step of coating the catalyst component on the inside the cells, and consequently, bonding with an elastic body holder caused by the liquid containing an adhesive component is suppressed, thereby preventing a trouble during detachment of the elastic body holder.

In the firing step of producing the honeycomb structure type catalyst, the resin composition of the honeycomb structure in which the resin coated part of the present invention is formed is burned off. As a result of the resin composition having been burned off, the once blocked pores reappear on the outer peripheral wall, and the outer peripheral wall having high air permeability is formed together with the partition walls of the cells covered with the catalyst composition.

The honeycomb structure type catalyst of the present invention catalyzed in this manner is schematically shown in FIG. 4. In FIG. 4, the catalyst composition 13 may be supported on the surface of the partition walls, may be impregnated and supported in the pores 7 of the partition walls 4, or may be supported in both manners. In the case where the catalyst composition 13 is supported on the surface of the partition wall 4, a layer of the catalyst composition 13 may be uniformly formed on the entire surface of the partition wall 4, and a part of the catalyst composition 13 may penetrate into the pores 7 of the partition wall 4 as shown in FIG. 4, so that it need not necessarily be supported on the surface of the partition wall 4. Also, the penetration depth of the catalyst into the pores may be shallow.

Figure 5:
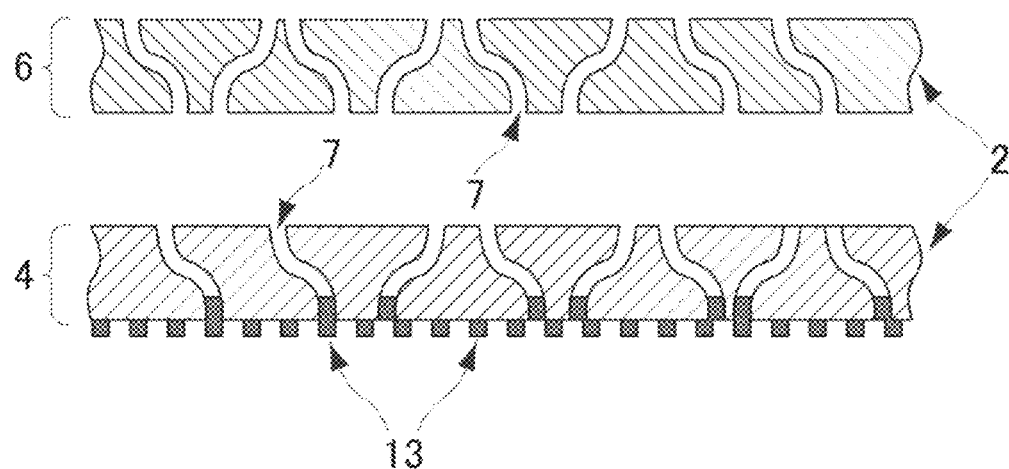
FIG. 5 is an explanatory diagram showing locations of a catalyst carried on the honeycomb structure of the present invention, magnifying the part B of FIG. 4.

The state of such a catalyst composition 13 is schematically represented in FIG. 5, which is a partially enlarged view of FIG. 4. FIG. 5 shows an example in which the catalyst composition 13 penetrates into the pores 7 of the partition wall 4. Although the pores 7 may appear as though being filled with the catalyst composition 13 in FIG. 5, in reality, not all of the pores are completely filled. Pressurized air circulates in the wash coating step, creating a state where the catalyst composition has entered in a manner such that a sufficient clearance is present in the partition wall to allow exhaust gas to travel therethrough. Since the catalyst composition has entered in such a state, the honeycomb structured type catalyst also acts as a filter and can exhibit excellent exhaust gas purifying performance when used as a GPF.

With the honeycomb structure of the present invention, the pores 7 of the outer peripheral wall 6 are closed by the resin composition 8 across the entire area thereof, and when the catalyst composition 13 coated by means of the wash coating method is fired and set on the partition wall 4, the resin composition 8 is burned off and the pores 7 in the outer peripheral wall 6 are opened. As a result, a honeycomb structure type catalyst that suppresses pressure loss due to catalyzation is obtained. Moreover, since the catalyst composition 13 containing inorganic oxide particles does not enter the outer peripheral wall 6, it is possible to obtain a honeycomb structure type catalyst in which occurrence of cracking due to variation in the heat history when mounted on a car and used in a traveling state is extremely rare.

The outer peripheral wall of the honeycomb structure type catalyst of the present invention does not include a material for improving the isostatic strength thereof, and therefore, there may be concerns over insufficient strength, assuming that the catalyst is actually mounted on a car and used in a traveling state. To tackle such insufficient strength, when mounting the catalyst of the present invention on a car, it is preferable to take sufficient measures such as selecting an appropriate shock absorbing material and sufficiently covering the periphery of the catalyst outer peripheral wall using the shock absorbing material, so that shocks that occur when traveling are not transmitted directly to the catalyst. While this shock absorbing material is not particularly limited, a material that significantly hinders air permeability in the outer peripheral wall should not be selected, and a cotton-like shock absorbing material, a mesh-like shock absorbing material, or a spring-like shock absorbing material, each formed with a heat-resistant fiber material made of a metal or an inorganic oxide, is selected.

WORKING EXAMPLES

Hereinafter, the present invention will be described in more detail on the basis of working examples, but the invention is not limited to these examples.

(Honeycomb Substrate)

As a base material of the honeycomb structure, a cordierite made wall-flow honeycomb manufactured by NGK Insulators, Ltd., was prepared. Details are as follows.

Porosity: 65% for both the outer wall and the partition walls

Average pore diameter: Volume average of 20 μm measured by mercury porosimetry method Partition thickness: 10 mil (approximately 0.3 mm)

Cell density: 300 cel/inch$^2$ (approximately 46.5 cel/cm$^2$)

Diameter: 4.66 inch (118.4 mm)

Length: 5 inch (127 mm)

(Evaluation)

The honeycomb structure was wash-coated with a catalyst slurry. In the air blowing step, it was evaluated as "leaching occurred (Bad)" when the slurry leached out to the outer peripheral, and it was evaluated as "leaching not occurred (Good)" when the slurry did not leach out.

Then, the honeycomb structure was dried at 150° C. for 2 hours and then fired at 450° C. to prepare a honeycomb structure type catalyst. Then, having left the honeycomb structure type catalyst in an electric furnace at 580° C. for 20 minutes to simulate a situation of being mounted on a car, it was taken out of the furnace and left for 1 hour at room temperature to then carry out a thermal shock test.

In the thermal shock test, the surface of the honeycomb structure type catalyst was visually checked for the presence or absence of cracking, and then the presence or absence of cracking was also checked by hammering sounds on those in which no cracking was visually observed. The hammering sounds were compared with the hammering sound of a wall-flow honeycomb that has not undergone the resin coat layer formation process. Those that did not produce a muffled sound was evaluated as "cracking not present (Good)", and those that did produce a muffled sound was evaluated as "cracking present (Bad)". In the case where the slurry leached out to the outer peripheral wall, the slurry that leached out was wiped off, and the honeycomb structure type catalyst was then dried and fired, to carry out the same evaluation.

In addition to the evaluation of the thermal shock test, a comprehensive evaluation was made, taking into consideration the environmental aspect and the workability at the time of preparing the honeycomb structure. Those that were evaluated as being good (Good) and those that were evaluated as being particularly good (Excellent) were treated as "passed", and the rest was treated as "failed (Failed)".

Working Example 1

(1. Impregnation of Resin Composition to Honeycomb Substrate)

First, a polyvinyl alcohol (PVA) having an average polymerization degree of 1,900 was dissolved in water to prepare a resin composition solution of 5% by mass as a resin coated part formation liquid. The viscosity of the resin composition solution (measured at 25° C. with a Brookfield type viscometer) was 6 mPa·s.

Next, the resin composition solution was placed in a liquid bath of a coating apparatus, and the honeycomb substrate was placed on two coating/driving rollers so that the circumferential side faces of the rollers and the honeycomb substrate were in contact with each other. Then, the undersides of the coating/driving rollers were brought into contact with the resin composition solution. Thereafter, while the coating/driving rollers were rotated at a rotation speed of 60 rpm and the resin composition solution was constantly supplied, the resin composition solution was applied to the surface of the honeycomb structure from the coating application site of the coating/driving rollers.

When visually inspected from both end faces of the honeycomb, it was confirmed that the resin composition solution was all impregnated into the outer peripheral wall, and the resin coated part was impregnated to a depth that exceeds one cell on the inner side in the outer peripheral wall axial direction (impregnation depth was approximately 2 mm, and roughly 1 to 2 cells). The resin coated part (PVA) with the resin composition solution was applied in an amount of 15 g/L over the entire outer surface of the outer peripheral wall of the honeycomb substrate. Note that the application amount of the resin coated part formation liquid can be controlled by adjusting the pressure for pressing the roller against the outer peripheral wall of the honeycomb substrate, the rotation speed of the roller, and so forth.

Once the honeycomb structure was dried, the PVA, which was the resin composition, was all impregnated into the outer peripheral wall, and no layer of PVA alone was formed on the outer peripheral wall surface. The honeycomb structure having such a resin coated part would suppress slurry from leaching out. The results are shown in Table 1.

The application amount of the resin coated part formation liquid can also be controlled by adjusting the viscosity of the liquid. In either case of a PVA aqueous solution having an average polymerization degree of 1,500 at 10° C. or case of a PVA aqueous solution having an average polymerization degree of 2,500 at 10° C., a resin composition solution having a viscosity of approximately 200 mPa·s could be prepared by setting the concentration to approximately 3 to 7% by mass. When this was used as a resin coated part formation liquid and applied to the honeycomb substrate in the same manner as described above, the impregnation depth was approximately 2 mm. The PVA, which was the resin composition, was all impregnated into the outer peripheral wall, reaching the cell partition wall, and no layer of PVA alone was formed on the outer peripheral wall surface when the honeycomb structure was dried. The honeycomb structure having such a resin coated part would suppress slurry from leaching out.

On the other hand, in either case of a PVA aqueous solution having an average polymerization degree of 1,500 at 10° C. or case of a PVA aqueous solution having an average polymerization degree of 2,500 at 10° C., a resin composition solution having a viscosity of approximately 5 mPa·s could be prepared by setting the concentration to approximately 2% by mass or less. When this was used as a resin coated part formation liquid and applied to the honeycomb substrate in the same manner as described above, the impregnation depth was approximately 7 mm. The PVA, which was the resin composition, was all impregnated into the outer peripheral wall, reaching the cell partition walls, and no layer of PVA alone was formed on the outer peripheral wall surface when the honeycomb structure was dried. The honeycomb structure having such a resin coated part would suppress slurry from leaching out. However, since the impregnation depth is excessively long and the resin further reaches the cell on the far side, the effective area on which the catalyst composition is supported decreases.

(2. Production of Honeycomb Structure Type Catalyst)

First, a catalyst composition containing alumina, ceria, and zirconia supporting three-way catalysts Rh and Pd was prepared, and was mixed with water to form a slurry. Then, the catalyst slurry was prepared by pulverizing the slurry with a ball mill so that the particle diameter D90 thereof was 3 μm when the cumulative distribution from the small particle diameter side in the particle size distribution was 90%.

Subsequently, the honeycomb structure having the resin coated part obtained in 1. above was coated with the catalyst composition slurry containing three-way catalysts Rh and Pd, alumina, ceria, and zirconia by means of a wash coating method. The amount of wash coat per unit volume of the honeycomb was 60 g/L. An end portion of the honeycomb structure was grasped with a balloon, immersed in a liquid bath, pulled out of the liquid bath, and turned over. Then, air was blown to the honeycomb structure for 3 seconds at an air pressure of 15 psi (0.1 MPa) in the slurry removal step. The honeycomb structure was observed at the time of blowing air thereto, but the catalyst composition slurry did not leach out to the outer peripheral wall.

Thereafter, the honeycomb structure coated with the catalyst composition was dried at 150° C. for 2 hours and subsequently fired at 450° C. for 3 hours. The obtained honeycomb structure type catalyst was then subjected to a thermal shock test in the manner described above. As with the case of the honeycomb structure, there was no muffled sound therein, and therefore, it was determined that no cracking occurred. The results are shown in Table 1.

Working Example 2

A honeycomb structure having a resin coated part of the resin composition was prepared in the same manner as in Working Example 1 except that an acrylic resin (an aqueous varnish, manufactured by Washin Paint Co., Ltd.) was used in place of the polyvinyl alcohol used in Working Example 1.

When visually inspected from both end faces of the honeycomb, as with Working Example 1, it was confirmed that the resin composition solution was all impregnated into the outer peripheral wall. The resin composition solution (acrylic resin) was applied in an amount of approximately 8 g/L over the entire outer surface of the outer peripheral wall of the honeycomb substrate.

Once the honeycomb structure was dried, the acrylic resin, which was a resin composition, was all impregnated into the outer peripheral wall, and no layer of acrylic resin alone was formed on the outer peripheral wall surface. The honeycomb structure having such a resin coated part would suppress slurry from leaching out. The results are shown in Table 1.

A honeycomb structure type catalyst was obtained in the same manner as that in Working Example 1, using the honeycomb structure obtained in this manner. As with Working Example 1, the slurry did not leach out from the outer peripheral wall at the time of the air blowing process.

Thereafter, the honeycomb structure was dried at 150° C. for 2 hours and subsequently fired at 450° C. for 3 hours. Then the obtained catalyst was subjected to a thermal shock test in the manner described above. As with the case of the honeycomb structure, there was no muffled sound therein, and therefore, it was determined that no cracking occurred. The results are shown in Table 1.

Working Example 3

In place of the polyvinyl alcohol used in Working Example 1, a wax (is-fit (registered trademark) liquid shoe polish, manufactured by Morito Co., Ltd.) was used and this resin composition solution was filled inside the coating application roller. Next, a honeycomb substrate is placed on two driving rollers so that the circumferential side faces thereof are in contact with each other, the coating application roller is pressed on the honeycomb substrate from above, and the resin composition solution was attached to the outer surface of the honeycomb substrate while rotating the rollers, to prepare a honeycomb structure having a resin coated part of the resin composition.

When visually inspected from both end faces of the honeycomb, it was confirmed that the resin composition solution was all impregnated into the outer peripheral wall, and the resin coated part was impregnated to a depth that exceeds one cell on the inner side of the outer peripheral wall axial direction, as with Working Example 1. The resin composition solution (wax) was applied in an amount of 15 g/L over the entire outer surface of the outer peripheral wall of the honeycomb substrate.

Once the honeycomb structure was dried, the wax, which was the resin composition, was all impregnated into the outer peripheral wall, and no layer of wax alone was formed on the outer peripheral wall surface. The honeycomb structure having such a resin coated part would suppress slurry from leaching out. The results are shown in Table 1.

A honeycomb structure type catalyst was obtained in the same manner as that in Working Example 1, using the honeycomb structure obtained in this manner. As with Working Example 1, the slurry did not leach out from the outer peripheral wall at the time of the air blowing process.

Thereafter, the honeycomb structure was dried at 150° C. for 2 hours and subsequently fired at 450° C. for 3 hours. Then the obtained catalyst was subjected to a thermal shock test in the manner described above. As with the case of the honeycomb structure, there was no muffled sound therein, and therefore, it was determined that no cracking occurred. The results are shown in Table 1.

Comparative Example 1

A wall-flow honeycomb similar to that used in Working Example 1 was used, and a slurry of the catalyst composition was coated by means of wash coating method in the same manner as that in Working Example 1 without coating the resin composition.

Unlike Working Example 1, since the resin composition was not applied to the honeycomb substrate, the resin coated part was not formed on the honeycomb structure at the time of production. Therefore, when air was blown in the slurry removal step at the time of wash coating, the catalyst composition slurry leached out severely from the outer peripheral wall to the surface of the honeycomb structure.

The obtained catalyst was evaluated as having cracking because a muffled sound was heard therefrom in the thermal shock test. The results are shown in Table 1.

TABLE 1

|  | Honeycomb structure | | | Honeycomb structure type catalyst | | |
|---|---|---|---|---|---|---|
|  | Resin coating | | | | | |
|  | Resin type | amount (g/L) | Outer shell layer | Slurry leach | Cracking in production | Complehensive evaluation |
| Working Example 1 | PVA | 15 | Outer peripheral wall and cell partition wall | Good | Good | Excellent |
| Working Example 2 | Acrylic resin | 8 | Outer peripheral wall | Good | Good | Good |
| Working Example 3 | Wax | 15 | Outer peripheral wall and cell partition wall | Good | Good | Good |
| Comparative Example 1 | N/A | 0 | None | Bad | Bad | Failed |

"Evaluation"

Based on Table 1 showing the above results, according to Working Examples 1 to 3 of the present invention, a resin coated part of a resin composition was formed on the honeycomb structure, and the PVA, the acrylic resin, and the wax each serving as a resin composition were all impregnated into the pores of the entire peripheral wall of the honeycomb. Also, the PVA and wax among these reached the cell partition walls. As a result, the resin coated part on the honeycomb structure formed with such a resin composition suppressed the catalyst slurry from leaching out to the outer peripheral wall in the air blowing process. The honeycomb structure type catalyst obtained by using this honeycomb structure can be effectively used as a GPF since no cracking was confirmed in the thermal shock test. PVA, acrylic resin and wax serving as a resin composition are all effective, but the PVA was the best resin composition when judged the usage conditions in a comprehensive manner.

On the other hand, the honeycomb structure was used as it was in Comparative Example 1, and the resin coated part of a resin composition was not formed. As a result, the catalyst slurry leached out severely. Such a honeycomb structure type catalyst cannot be effectively used as a GPF since cracking was confirmed in the thermal shock test.

INDUSTRIAL APPLICABILITY

The present invention can be suitably used for a filter for collecting particulate substances contained in exhaust gas of a car engine, and more particularly for a catalyzed filter (GPF) for capturing particulate substances in exhaust gas of a gasoline engine.

DESCRIPTION OF REFERENCE SIGNS

1 Honeycomb structure
2 Honeycomb substrate
3 Resin coated part
4 Partition wall
5 Cell
6 Outer peripheral wall
7 Pore
8 Resin composition
9 Plugged portion
11 Inlet end face
12 Outlet end face
13 Catalyst composition

The invention claimed is:

1. A honeycomb structure for producing a catalyst, the honeycomb structure having: a honeycomb substrate composed of porous partition walls forming a plurality of cells and a porous outer portion; and a resin composition on the outer portion of the honeycomb substrate, wherein
the outer portion and the partition walls of the honeycomb substrate are formed of the same material; a porosity of the honeycomb substrate is 50% or more; and the resin composition is impregnated into pores of the whole outer portion; and the impregnation depth is equal to the outer portion thickness, or at least a part of the resin composition is impregnated deeper than the outer portion and reaches the cell partition walls, and
a porosity of the partition walls and a porosity of the outer portion are the same.

2. The honeycomb structure according to claim 1, wherein the resin composition includes one or more organic resin components selected from polyvinyl alcohol (PVA), acrylic resin, acrylic silicone resin, acrylic styrene resin, vinyl acetate resin, polyurethane resin, polyethylene glycol (PEG), agar, gelatin, starch, sucrose, and wax.

3. The honeycomb structure according to claim 1, wherein the resin composition does not contain inorganic particles.

4. The honeycomb structure according to claim 1, wherein the honeycomb substrate has a porosity of 50 to 80%.

5. The honeycomb structure according to claim 1, wherein the honeycomb substrate has a porosity of 60 to 70%.

6. The honeycomb structure according to claim 1, wherein the honeycomb substrate has an overall length of 50 to 300 mm, and the honeycomb substrate has an end face width (a diameter in a case of a circular end face) of 50 to 200 mm.

7. The honeycomb structure according to claim 1, wherein the honeycomb substrate has an average pore diameter of 10 to 25 µm measured by a mercury porosimeter.

8. The honeycomb structure according to claim 1, wherein the cells each have a plugged portion in an open end on an inlet end face side and in an open end on an outlet end face side, and the plugged portions are alternately arranged.

9. The honeycomb structure according to claim 1, wherein the resin composition has a coating amount of 8 g/L or more per unit volume of the honeycomb structure.

10. A honeycomb structure catalyst comprising a catalyst composition supported on a honeycomb structure composed of a honeycomb substrate having porous partition walls forming a plurality of cells and a porous outer portion, in which:
the outer portion and the partition walls of the honeycomb substrate are integrally formed of the same material; a porosity of the honeycomb structure is 50% or more; the catalyst composition is supported only on the partition walls of the cells and is not supported inside or on the surface of the outer portion; and the outer portion pores does not comprise inorganic particles.

11. The honeycomb structure catalyst according to claim 10, wherein
the honeycomb substrate has a porosity of 50 to 80%, and an average pore diameter measured by a mercury porosimeter of the cell partition walls and the outer portion of the honeycomb substrate is 10 to 25 µm, and
the cells of the honeycomb substrate each have a plugged portion in an open end on an inlet end face side and in an open end on an outlet end face side, and the plugged portions are alternately arranged.

12. The honeycomb structure catalyst according to claim 10, wherein
the catalyst composition contains one or more noble metal elements selected from a group consisting of Pt, Pd and Rh.

13. The honeycomb structure catalyst according to claim 10, wherein the honeycomb structure catalyst is a gasoline particulate filter (GPF).

14. The honeycomb structure according to claim 1, wherein the outer portion and the partition walls of the honeycomb substrate are integrally formed of the same material.

15. The honeycomb structure according to claim 1, wherein a thermal expansion coefficient of the partition walls and a thermal expansion coefficient of the outer peripheral wall are the same.

* * * * *